United States Patent
Imamura et al.

(10) Patent No.: US 9,026,556 B2
(45) Date of Patent: May 5, 2015

(54) COMPUTER-READABLE MEDIUM STORING DATA SHARING PROGRAM, DATA SHARING METHOD, AND DATA SHARING PROCESSOR

(75) Inventors: Nobutaka Imamura, Kawasaki (JP); Yuichi Tsuchimoto, Kawasaki (JP); Toshihiro Shimizu, Kawasaki (JP); Hiromichi Kobashi, Kawasaki (JP); Miho Murata, Kawasaki (JP); Soichi Shigeta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1066 days.

(21) Appl. No.: 12/613,086

(22) Filed: Nov. 5, 2009

(65) Prior Publication Data

US 2010/0125550 A1    May 20, 2010

(30) Foreign Application Priority Data

Nov. 17, 2008   (JP) .................................. 2008-293217

(51) Int. Cl.
*G06F 17/30* (2006.01)
(52) U.S. Cl.
CPC .................................. *G06F 17/30575* (2013.01)
(58) Field of Classification Search
CPC ....................................................... G06F 17/30
USPC ............................. 707/600–899; 709/225, 205
See application file for complete search history.

(56) References Cited

U.S. PATENT DOCUMENTS

| | | | |
|---|---|---|---|
| 2001/0000811 A1* | 5/2001 | May et al. | 709/205 |
| 2004/0054779 A1* | 3/2004 | Takeshima et al. | 709/225 |
| 2007/0208782 A1* | 9/2007 | Carter et al. | 707/201 |

FOREIGN PATENT DOCUMENTS

JP    2007-58769    3/2007

* cited by examiner

*Primary Examiner* — Isaac M Woo
(74) *Attorney, Agent, or Firm* — Staas & Halsey LLP

(57) ABSTRACT

Each of plurality of nodes connected to each other via a network includes a local instance processor and a user application processor. The local instance processor executes a data sharing method for accessing shared data. The data sharing method includes: storing a value of first shared data with a function identifier of an update function upon receiving a registration request, wherein the update function is commutative and idempotent; updating the stored value of the first shared data to a first update value in accordance with an execution result of the update function upon receiving an update request; returning a completion message upon updating the stored value of the first shared data stored in the first node; and transmitting a first reflection request to a second node upon updating the stored value of the first shared data stored in the first node.

13 Claims, 38 Drawing Sheets

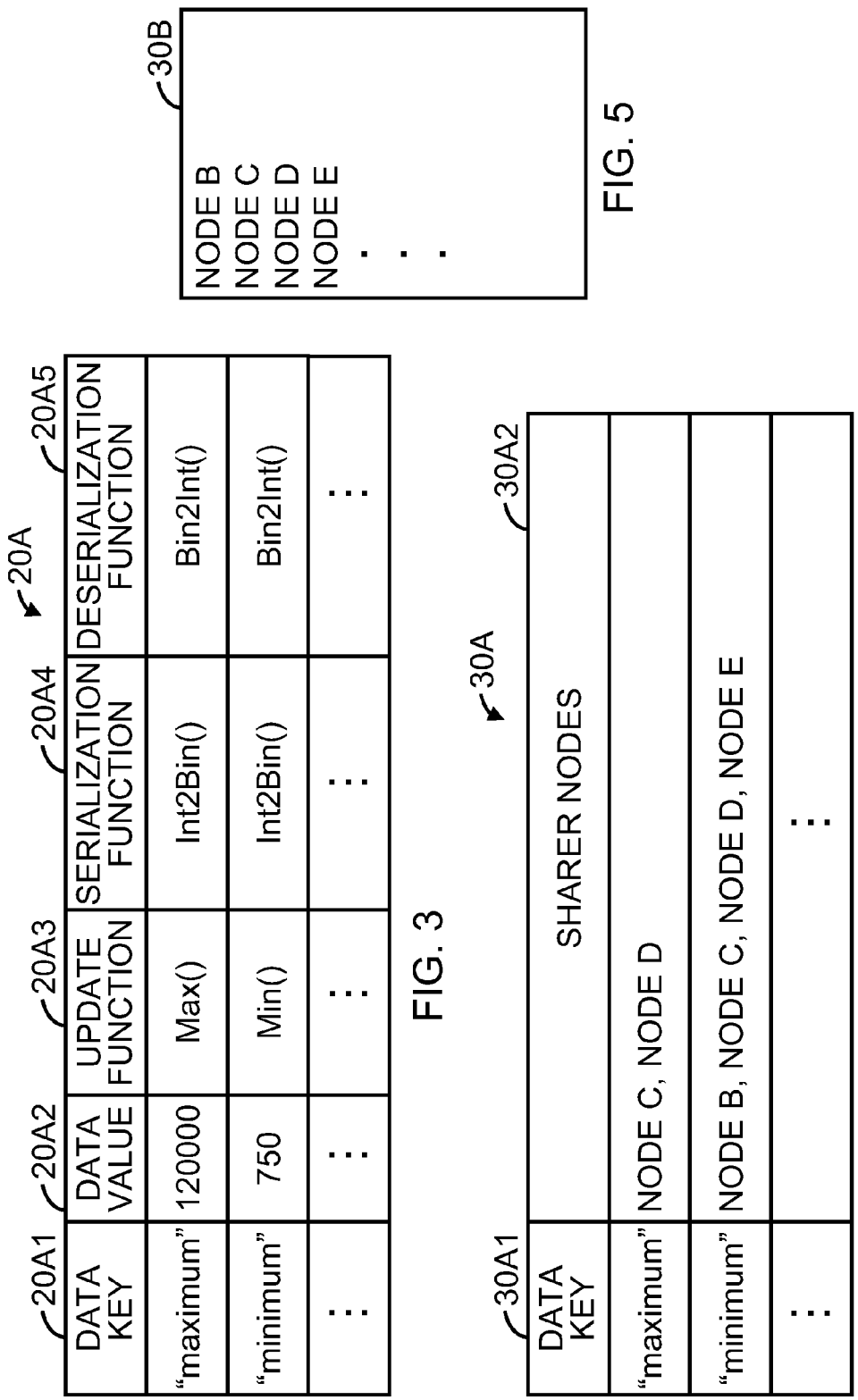

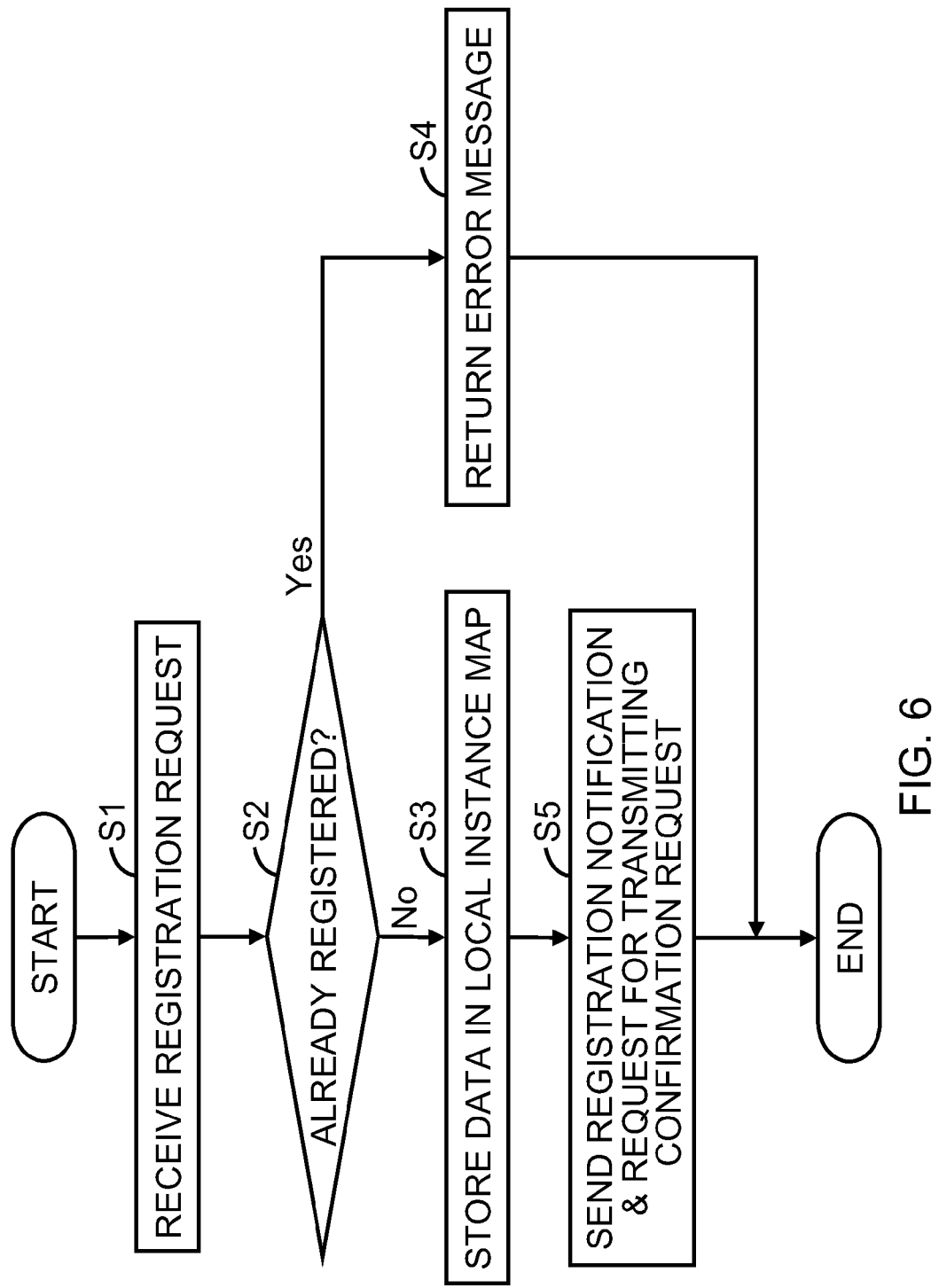

COMPUTER-READABLE MEDIUM STORING DATA SHARING PROGRAM, DATA SHARING METHOD, AND DATA SHARING PROCESSOR

CROSS-REFERENCE TO RELATED APPLICATION

This application claims the benefit of Japanese Application No. 2008-293217, filed Nov. 17, 2008 in the Japanese Patent Office, the disclosure of which is incorporated herein by reference.

FIELD

The embodiments discussed herein are related to a technique for sharing data between a plurality of nodes connected each other via a network.

BACKGROUND

In a computer system providing a distributed environment in which plurality of nodes are connected each other via a network, data sharing has been generally performed in which data is shared between some nodes and the value of the shared data is accessed from each of the some nodes. One of basic processes using shared data is, for example, a distribution in which one node creates and writes a value of the shared data and other nodes read the value of the shared data. Another basic process is, for example, an exchange in which writing and reading are mutually performed between nodes. Yet another basic process is, for example, an aggregation in which a calculation result of a user application processor in each node is sequentially reflected to the value of the shared data in accordance with a value of the calculation result.

Data sharing may be realized by allowing access to data in one node from another node connected to the one node via the network. Data sharing in this manner is used in a distributed object technique in which software components (objects) are disposed in a plurality of nodes on a network to be accessed from other nodes and the plurality of nodes operate in cooperation. Another method for realizing data sharing is, for example, a technique of a software distributed shared memory that virtually assumes a memory space equipped in each node as one shared memory area.

Access to the value of the shared data in another node requires a remote access via the network, thus takes a long time as compared with an access to local data. Further, as in the above-discussed example, the value of the shared data is written and read by a plurality of nodes to perform a process such as distribution, exchange, aggregation, and the like. Consequently, an exclusive access control is required to keep consistency of the content. However, in the case of applying the software distributed shared memory, the process of the exclusive access control is very complicated, so that it takes a long time for the exclusive access control itself. Further, in any method discussed above, when the shared data is locked by another node, access to the value of the locked shared data may be forced to stand by.

Thus, accessing the value of the shared data in a process of a user application processor may deteriorate performance because of process delays caused by a remote access and an exclusive access control. The process delay caused by accessing the value of the shared data has brought a sever influence to the deterioration of the performance especially in a cluster, a grid, or the like that realizes a high speed processing by building one virtual high performance computer by making a plurality of nodes to execute a parallel processing.

In order to avoid at least the state that writing the value of the shared data is postponed due to the exclusive access by another node, the following technique has been proposed. That is, the value of the shared data is preliminarily registered in each node, and writing in each node is respectively performed to the shared data registered in the self node. When writing is performed, synchronization is promptly made with corresponding shared data registered in other nodes (see, for example, Japanese Laid-open Patent Publication No. 2007-58769). Although the stand by for writing caused by the exclusive access control may be avoided with the technique, as discussed above, it is still necessary to make synchronization with corresponding shared data registered in other nodes right after writing the value of the shared data registered in the self node in order to prevent inconsistency with the value of the corresponding shared data registered in other nodes. Accordingly, the problem of the process delay of the user application processor due to a remote access may not be avoided in the result.

SUMMARY

According to an aspect of the present invention, provided is a computer-readable medium storing a data sharing program including computer-executable instructions enabling a computer to act as a local instance processor included in a first node out of a plurality of nodes communicably connected to each other via a network. Each of the plurality of nodes includes a local instance processor and a user application processor. The local instance processor included in each node executes a data sharing method for accessing shared data to cooperate with other nodes. The shared data is accessed in common by the plurality of nodes.

The data sharing method includes:

storing a value of first shared data in association with a function identifier capable of identifying an update function corresponding to the first shared data upon receiving a registration request from a user application processor included in the first node, wherein the registration request is for storing the value of the first shared data in association with the function identifier, wherein the update function is executed in updating a stored value of the first shared data, wherein the update function is commutative and idempotent;

updating the stored value of the first shared data stored in the first node to a first update value in accordance with an execution result of the update function identified by the function identifier associated with the first shared data upon receiving an update request from the user application processor included in the first node, wherein the update request is for updating the stored value of the first shared data stored in the first node to the first update value;

returning a completion message to the user application processor included in the first node upon updating the stored value of the first shared data stored in the first node, wherein the completion message conveys that update has been completed; and transmitting a first reflection request to a second node upon updating the stored value of the first shared data stored in the first node, wherein the first reflection request is for updating a stored value of the first shared data stored in the second node to the first update value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a data configuration of a local instance map according to an embodiment of the present invention;

FIG. 4 is a diagram illustrating an example of a data configuration of a network layer map according to an embodiment of the present invention;

FIG. 5 is a diagram illustrating an example of a data configuration of a node registration file according to an embodiment of the present invention;

FIG. 6 is a flowchart illustrating an example of an operation flow of a process executed by a local instance processor according to an embodiment of the present invention upon receiving a registration request from a user application processor;

DESCRIPTION OF EMBODIMENTS

In view of the problems discussed above, it is preferable to register the value of the shared data in each node and execute the synchronization independently from the process of the user application processor so as not to generate inconsistency in the value of the shared data for sharing data normally between nodes while avoiding a process delay of a user application processor due to the data sharing.

According to the embodiments, the value of the shared data is respectively registered in each node connected each other via a network. Even when the user application processor issues a reference request or an update request for the value of the shared data, the access is executed to the value of the shared data registered in the self node. Reflection of the update to the value of the shared data registered in other nodes is executed in asynchronous with the process of the user application processor. Further, the reflection of the update to the value of the shared data is executed in accordance with a calculation result of an update function which is commutative and idempotent. Consequently, data sharing may be realized without generating inconsistency in the value of the shared data between nodes while avoiding the process delay of the user application processor caused by the remote access to the value of the shared data and by the exclusive process of the shared data.

Hereinafter, embodiments of a data sharing mechanism in a distributed environment will be discussed.

Figure 1:
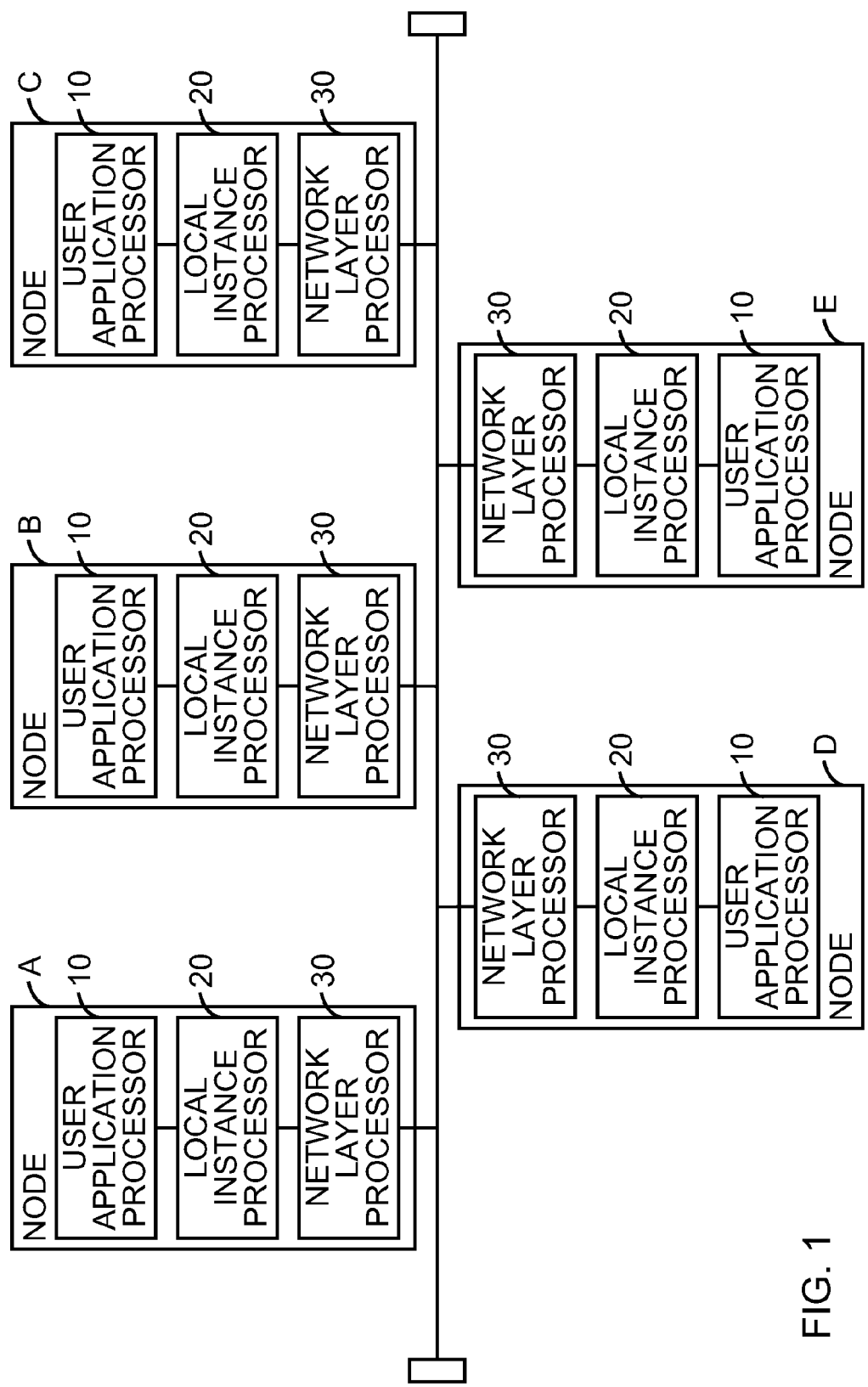
FIG. 1 is a diagram illustrating an example of a configuration of a system applied with a data sharing mechanism according to an embodiment of the present invention.
Figure 2:
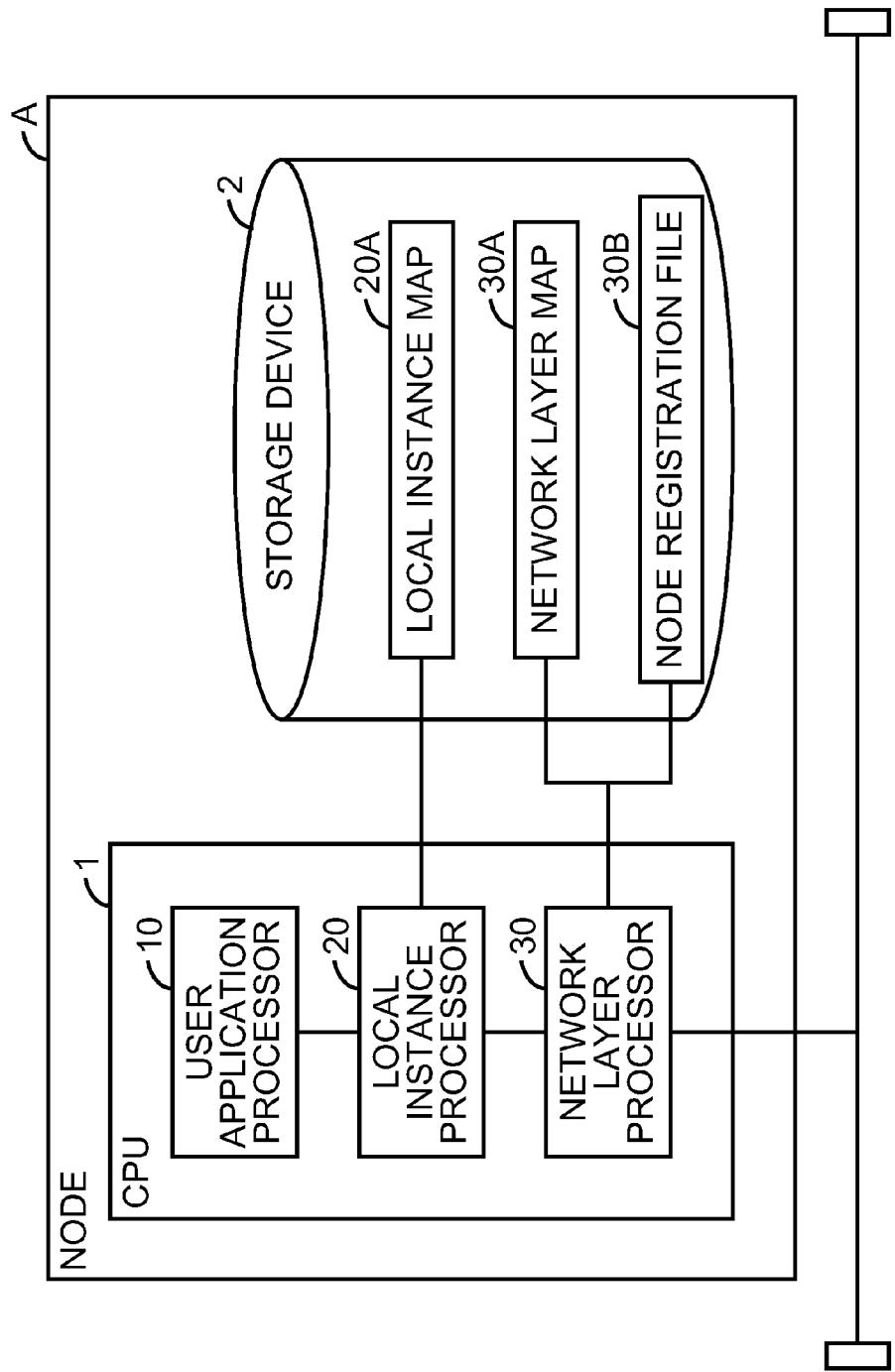
FIG. 2 is a diagram illustrating an example of a configuration of a node according to an embodiment of the present invention.

FIG. 1 is a diagram illustrating an example of a configuration of a system applied with a data sharing mechanism according to an embodiment of the present invention. FIG. 2 is a diagram illustrating an example of a configuration of a node according to an embodiment of the present invention.

In the system, a plurality of nodes are connected to each other via a network. Each node is a computer including at least a central processing unit (CPU) 1 and a storage device 2. Each of the nodes functions as a user application processor 10. The user application processor 10 shares data with other nodes and executes a process of a user application in cooperation with the other nodes while accessing the value of the shared data. Each node further functions as a local instance processor 20 for keeping the shared data and a network layer processor 30 for transmitting/receiving information about the shared data registered in each node to/from another node. FIG. 1 illustrates a system, as an example, including five nodes A to E, however, the number of the nodes and connection configuration are not limited to those illustrated in FIG. 1.

The configuration of the node will be further discussed with reference to FIG. 2. The user application processor 10 performs a process in cooperation with other nodes by using shared data. When accessing the value of the shared data, the user application processor 10 transmits an access request to the local instance processor 20. An access includes a reference to the value of the shared data and an update of the value of the shared data. The user application processor 10 accesses the value of shared data kept by the local instance processor 20 of the self node but not the value of the shared data registered in another node.

The local instance processor 20 manages a local instance map 20A, and stores a value of shared data in the local instance map 20A. FIG. 3 is a diagram illustrating an example of a data configuration of a local instance map according to an embodiment of the present invention. As illustrated in FIG. 3, the local instance map 20A contains a "DATA KEY" field 20A1, a "DATA VALUE" field 20A2, an "UPDATE FUNCTION" field 20A3, a "SERIALIZATION FUNCTION" field 20A4, and a "DESERIALIZATION FUNCTION" field 20A5.

The "DATA KEY" field 20A1 stores a data key capable of uniquely identifying shared data.

The "DATA VALUE" field 20A2 stores a value of the shared data.

The "UPDATE FUNCTION" field 20A3 stores an update function identifier capable of identifying an update function employed for determining adequacy of updating the value of the shared data.

The "SERIALIZATION FUNCTION" field 20A4 stores a serialization function identifier capable of identifying a serialization function for converting data in a format on memory into data in a format on the network.

The "DESERIALIZATION FUNCTION" field 20A5 stores a deserialization function identifier capable of identifying a deserialization function for converting data in a format on the network into data in a format on memory.

Note that the user application processor 10 of each node keeps at least data regarding a data key and an update function both corresponding to certain shared data. The local instance processor 20 accesses the value of the shared data stored in the local instance map 20A upon receiving an access request for accessing the value of the shared data from the user application processor 10. Upon updating the value of the shared data stored in the local instance map 20A, the local instance processor 20 transmits to the network layer processor 30 a request for transmitting a reflection request for reflecting the update value to the value of the shared data stored in the local instance map 20A of another node. Upon receiving via the network layer processor 30 an update notification conveying that a value of shared data stored in the local instance map 20A of another node has been updated, the local instance processor 20 reflects the update to the value of the shared data stored in the local instance map 20A of the self node.

The update function is preferably commutative, that is, the same result is obtained even when update order is different, and also preferably idempotent, that is, the same result is obtained even when same function is repeatedly performed. Examples of the update function which is commutative and idempotent include "Max( )" for obtaining the maximum value and "Min( )" for obtaining the minimum value. The update function is associated with the shared data, and the value of the shared data is updated not by simply overwritten but in accordance with the update function. Update in accordance with an update function which is commutative and idempotent has an advantage, that is, inconsistency of values of the shared data between nodes after synchronization does not occur even when the value of the shared data is updated in each node and the order of update to be reflected is different between the nodes in the subsequent synchronization process of the shared data. Consequently, when reflecting update to the value of the shared data registered in another node, inconsistency of the value of the shared data between the nodes may be avoided without an exclusive access control to every targeted node and prompt synchronization in a strict update order.

The update function is not limited to a function predefined by the system environment of the node. The update function may be a so-called user-defined function whose calculation content may be arbitrarily defined in the user application processor. With a user-defined function, an atomic update process, for example, may be arbitrarily defined, in which a plurality of updates are executed to the value of the shared data in an integrated manner as a successive transaction.

The network layer processor 30 manages a network layer map 30A. FIG. 4 is a diagram illustrating an example of a data configuration of a network layer map according to an embodiment of the present invention. As illustrated in FIG. 4, the network layer map 30A contains a "DATA KEY" field 30A1 and a "SHARER NODES" field 30A2.

The "DATA KEY" field 30A1 stores a data key capable of uniquely identifying shared data.

The "SHARER NODES" field 30A2 stores node identifiers of nodes sharing the shared data. A node identifier is capable of identifying a node.

Upon receiving a request for transmitting a reflection request to another node after a value of shared data stored in the local instance map 20A of the self node has been updated, the network layer processor 30 determines other nodes accessing the value of the shared data in accordance with the network layer map 30A to transmit the reflection request to the determined nodes. Upon receiving a reflection request after a value of shared data stored in the local instance map 20A of another node has been updated, the network layer processor 30 sends the reflection request to the local instance processor 20 of the self node.

The network layer processor 30 also manages a node registration file 30B. FIG. 5 is a diagram illustrating an example of a data configuration of a node registration file according to an embodiment of the present invention. As illustrated in FIG. 5, the node registration file 30B stores node identifiers of nodes to which the self node accesses. From among all other nodes connected to the network, only adjacent nodes which share the same shared data with the self node may be appropriately registered in the node registration file 30B. When the self node is activated, the network layer processor 30 confirms whether all node identifiers of other nodes sharing shared data accessed by the self node are registered in the network layer map 30A.

Programs for the local instance processor 20 and the network layer processor 30 may be provided in each node in the form of middleware executed on an operating system or in the form of libraries linked to a program for the user application processor 10. The local instance map 20A, the network layer map 30A, and the node registration file 30B may be stored in the storage device 2 (for example, memory, hard disc, or the like) of each node.

Figure 40:
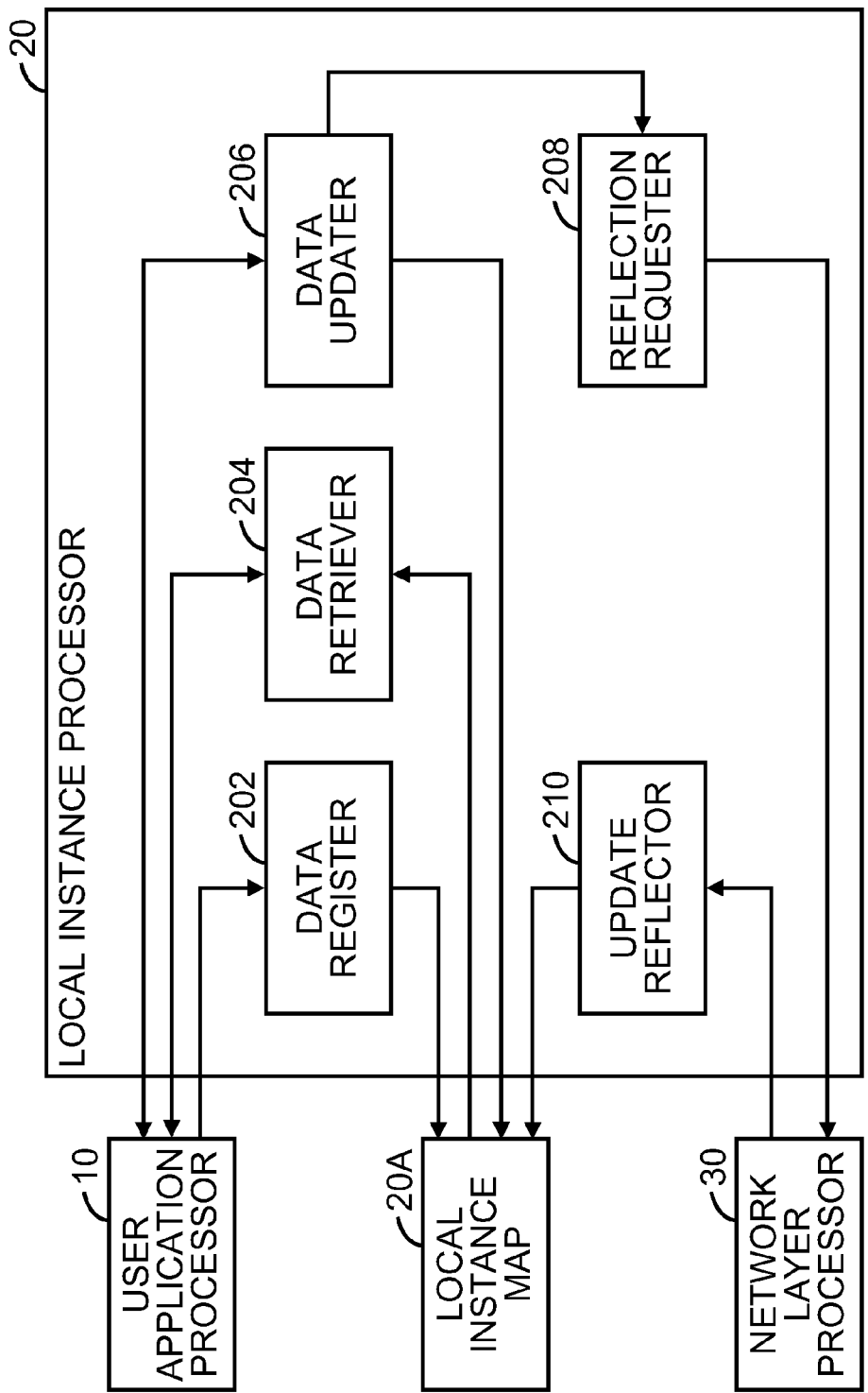
FIG. 40 is a diagram illustrating an example of a configuration of a local instance processor according to an embodiment of the present invention.

FIG. 40 is a diagram illustrating an example of a configuration of a local instance processor according to an embodiment of the present invention. As illustrated in FIG. 40, the local instance processor 20 functions as a data register 202, a data retriever 204, a data updater 206, reflection requester 208, and an update reflector 210.

The data register 202 registers a value of first shared data in connection with data regarding an update function corresponding to the first shared data upon receiving a registration request from a user application processor included in the first node. The registration request specifies the value of the first shared data and the data regarding the update function. The update function is executed in updating the value of the first shared data. The update function is commutative and idempotent.

The data retriever 204 returns a registered value of second shared data to the user application processor included in the first node upon receiving a reference request from the user application processor included in the first node.

The data updater 206 updates a registered value of third shared data with a first update value in accordance with a result derived by executing the update function to return an update notification to the user application processor included in the first node upon receiving, along with the first update value, an update request from the user application processor included in the first node.

The reflection requester 208 transmits a first reflection request to a second node upon updating a value of the third shared data registered in the first node with a second update value, out of synchronization with the update notification to the user application processor included in the first node. The first reflection request requests the second node to reflect the second update value to a value of the third shared data registered in the second node.

The update reflector 210 reflects a third update value to the value of the fourth shared data registered in the first node in accordance with a result derived by executing the update function upon receiving a second reflection request from a third node. The second reflection request requests the first node to reflect the third update value to a value of the fourth shared data registered in the first node.

A process executed in the local instance processor 20 will be discussed with reference to flowcharts.

FIG. 6 is a flowchart illustrating an example of an operation flow of a process executed by a local instance processor according to an embodiment of the present invention upon receiving a registration request from a user application processor.

In operation S1, the local instance processor 20 receives from the user application processor 10 a registration request including a data key, an initial value of shared data, an update function identifier, a serialization function identifier, and a deserialization function identifier.

In operation S2, the local instance processor 20 determines whether the received a data key has already been registered, that is, stored in the local instance map 20A.

In operation S3, when the received a data key has not been registered ("No" in operation S2), the local instance processor 20 stores the received data in the local instance map 20A, and notifies the user application processor 10 that registration has been completed.

In operation S4, when the received a data key has been registered ("Yes" in operation S2), the local instance processor 20 returns the user application processor 10 an error message conveying that the data key is overlapped. Then, the local instance processor 20 terminates the process.

In operation S5, the local instance processor 20 sends the network layer processor 30 a registration notification conveying that new shared data has been registered. The local instance processor 20 also sends the network layer processor 30 a request for transmitting a confirmation request for confirming whether the shared data identified by a data key "X" (it is assumed here that the data key of the new shared data is "X") is shared by another node. Then, the local instance processor 20 terminates the process.

Upon receiving the registration notification, the network layer processor 30 starts a process illustrated in FIG. 13 which will be discussed later.

Figure 7:
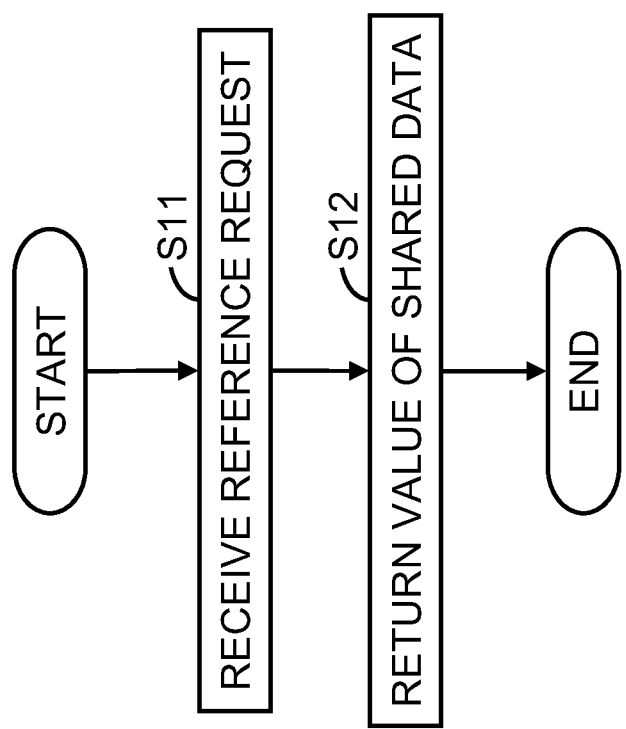
FIG. 7 is a flowchart illustrating an example of an operation flow of a process executed by a local instance processor according to an embodiment of the present invention upon receiving a reference request from a user application processor.

FIG. 7 is a flowchart illustrating an example of an operation flow of a process executed by a local instance processor according to an embodiment of the present invention upon receiving a reference request from a user application processor.

In operation S11, the local instance processor 20 receives from the user application processor 10 a reference request for referring to the value of the shared data, with a data key as an argument.

In operation S12, with reference to the local instance map 20A, the local instance processor 20 retrieves the value of the shared data identified by the data key as the received argument to return to the user application processor 10. Then, the local instance processor 20 terminates the process.

Figure 8:
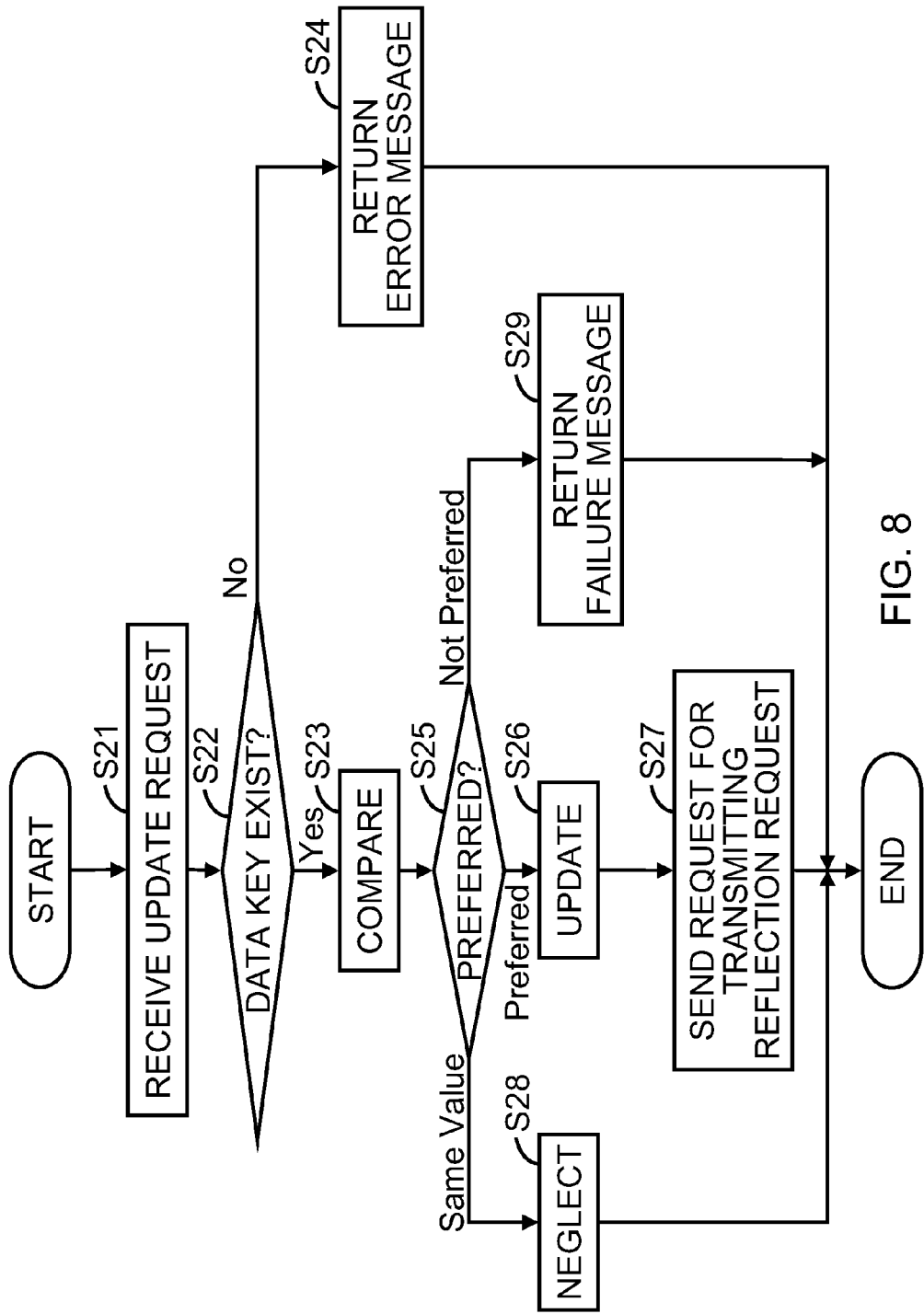
FIG. 8 is a flowchart illustrating an example of an operation flow of a process executed by a local instance processor according to an embodiment of the present invention upon receiving an update request from a user application processor.

FIG. 8 is a flowchart illustrating an example of an operation flow of a process executed by a local instance processor according to an embodiment of the present invention upon receiving an update request from a user application processor.

In operation S21, the local instance processor 20 receives from the user application processor 10 an update request for updating the value of the shared data, with a data key and an update value of the shared data as arguments.

In operation S22, the local instance processor 20 determines whether the data key as the argument exists in the local instance map 20A.

In operation S23, when the data key exists ("Yes" in operation S22), the local instance processor 20 compares the update value with the value of the shared data stored in the local instance map 20A in accordance with the update function corresponding to the data key.

In operation S24, when the data key does not exist ("No" in operation S22), the local instance processor 20 returns the user application processor 10 an error message conveying that there is no update target. Then, the local instance processor 20 terminates the process.

In operation S25, the local instance processor 20 determines whether the update value is preferred than the value stored in the local instance map 20A in response to the result of the comparison in operation S23, to determine whether to execute the update.

In operation S26, when the update value is preferred than the value stored in the local instance map 20A ("Preferred" in operation S25), the local instance processor 20 updates the value of the shared data stored in the local instance map 20A with the update value, and returns the user application processor 10 a completion message conveying that the update has been completed.

In operation S27, the local instance processor 20 sends the network layer processor 30 an update notification conveying that the value of the shared data stored in the local instance map 20A has been updated. The local instance processor 20 also sends the network layer processor 30 a request to transmit a reflection request for reflecting the update value to another node sharing the shared data of the update target. Then, the local instance processor 20 terminates the process.

In operation S28, when the update value is the same as the value stored in the local instance map 20A ("Same Value" in operation S25), the local instance processor 20 does not update the value of the shared data, and terminates the process.

In operation S29, when the value stored in the local instance map 20A is preferred than the update value ("Not Preferred" in operation S25), the local instance processor 20 does not update the value of the shared data but returns the user application processor 10 a failure message conveying that the update is failed. Then, the local instance processor 20 terminates the process.

A case in which "Max( )" for obtaining the maximum value is associated, as the update function, with the shared data to be updated will be discussed below, as a concrete example of the update process in accordance with a calculation result of the update function. In this case, when the update value is larger than the value of the shared data stored in the local instance map 20A, since the update value is preferred than the value of the shared data stored in the local instance map 20A, the local instance processor 20 executes the update. When the update value and the value of the shared data stored in the local instance map 20A are the same value, the local instance processor 20 neglects the update request. When the update value is smaller than the value of the shared data stored in the local instance map 20A, the local instance processor 20 does not execute the update, and returns the user application processor 10 a failure message conveying that the update is failed.

Figure 9:
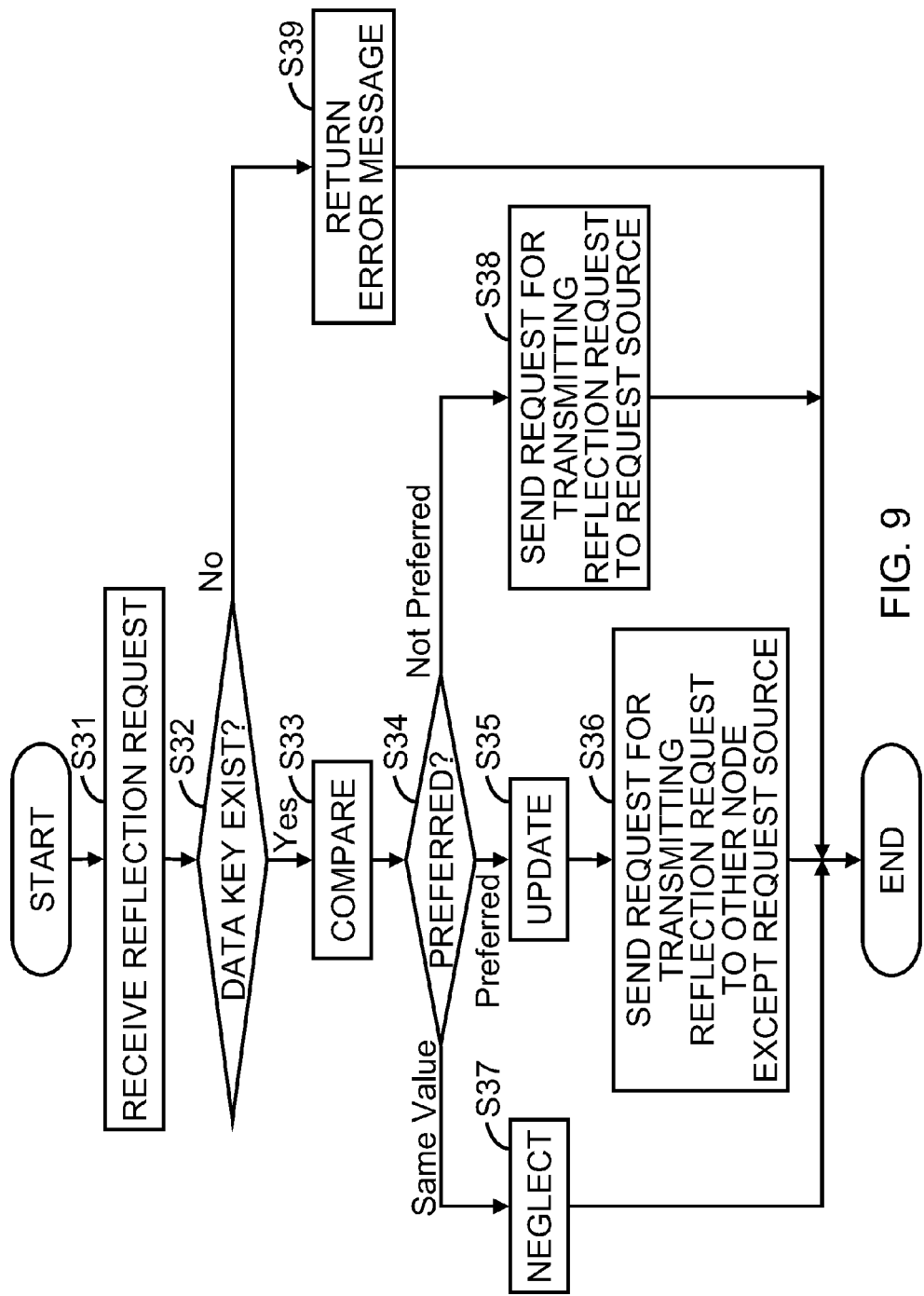
FIG. 9 is a flowchart illustrating an example of an operation flow of a process executed by a local instance processor according to an embodiment of the present invention upon receiving a reflection request from a network layer processor.

FIG. 9 is a flowchart illustrating an example of an operation flow of a process executed by a local instance processor according to an embodiment of the present invention upon receiving a reflection request from a network layer processor. The network layer processor 30 receives a reflection request from another node and sends the reflection request to the local instance processor 20.

In operation S31, the local instance processor 20 receives a reflection request for updating the value of the shared data from the network layer processor 30 with a data key and an update value of the shared data as arguments.

In operation S32, the local instance processor 20 determines whether the data key as the argument exists in the local instance map 20A.

In operation S33, when the data key exists ("Yes" in operation S32), the local instance processor 20 compares the update value with the value of the shared data stored in the local instance map 20A in accordance with the update function corresponding to the data key.

In operation S34, the local instance processor 20 determines whether the update value is preferred than the value stored in the local instance map 20A in response to the result of the comparison in operation S33, to determine whether to execute the update.

In operation S35, when the update value is preferred than the value stored in the local instance map 20A ("Preferred" in operation S34), the local instance processor 20 updates the value of the shared data stored in the local instance map 20A with the update value, and sends the user application processor 10 an update event for notifying that the shared data has been updated.

In operation S36, the local instance processor 20 sends the network layer processor 30 a request for transmitting a reflection request for reflecting the update value to another node sharing the shared data of the update target, except the source node from which the local instance processor 20 has received the prior reflection request. Then, the local instance processor 20 terminates the process.

In operation S37, when the update value is the same as the value stored in the local instance map 20A ("Same Value" in operation S34), the local instance processor 20 does not update the value of the shared data, and terminates the process.

In operation S38, when the value stored in the local instance map 20A is preferred than the update value ("Not Preferred" in operation S34), the local instance processor 20 does not update the value of the shared data but sends the network layer processor 30 a request for transmitting a reflection request for reflecting the value stored in the local instance map 20A, to the source node from which the local instance processor 20 has received the prior reflection request. Then, the local instance processor 20 terminates the process.

In operation S39, when the data key does not exist ("No" in operation S32), the local instance processor 20 returns the network layer processor 30 an error message conveying that there is no update target. Then, the local instance processor 20 terminates the process.

One of situations where operation S38 is executed may be a case that the value of the shared data is updated when another node is newly activated but not operated yet, and thus it is necessary to reflect the latest update value to the newly activated node.

Upon receiving this request, the network layer processor 30 executes a process illustrated in FIG. 16 which will be discussed later.

Figure 10:
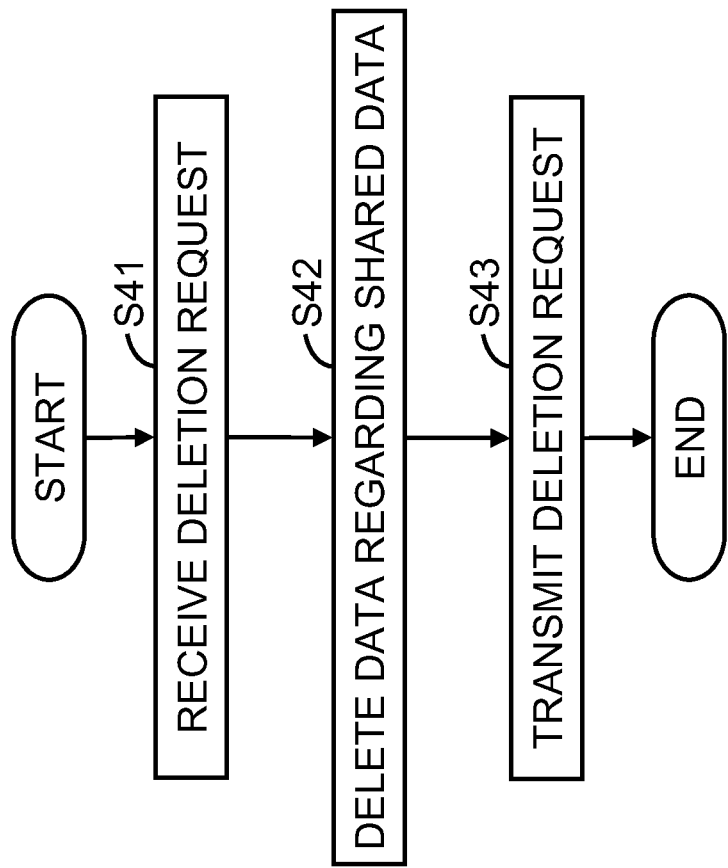
FIG. 10 is a flowchart illustrating an example of an operation flow of a process executed by a local instance processor according to an embodiment of the present invention upon receiving a deletion request from a user application processor.

FIG. 10 is a flowchart illustrating an example of an operation flow of a process executed by a local instance processor according to an embodiment of the present invention upon receiving a deletion request from a user application processor.

In operation S41, the local instance processor 20 receives a deletion request for deleting data regarding shared data from the user application processor 10 with a data key as an argument.

In operation S42, the local instance processor 20 deletes the data regarding the shared data identified by the data key as an argument from the local instance map 20A.

In operation S43, the local instance processor 20 transmits a deletion request to the network layer processor 30 with the data key as an argument. Then, the local instance processor 20 terminates the process.

Next, a process that is executed by the network layer processor 30 will be discussed below.

Figure 11:
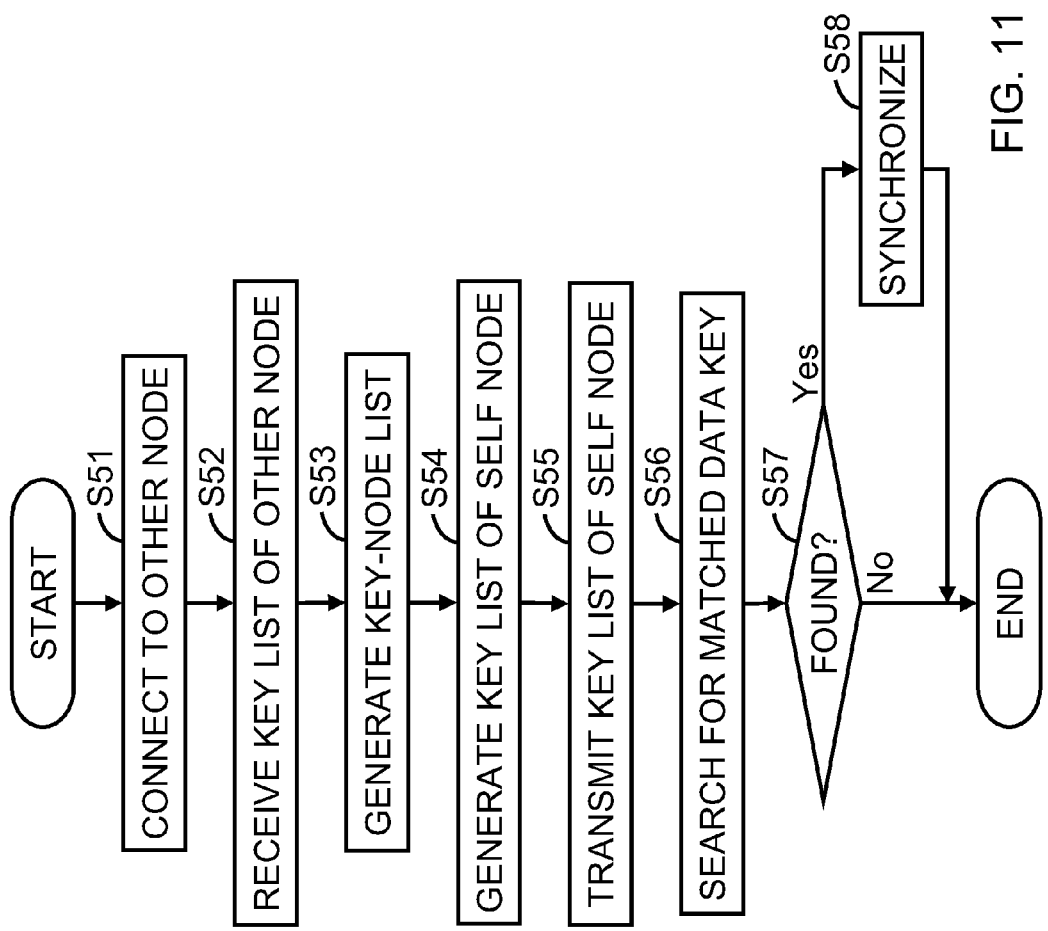
FIG. 11 is a flowchart illustrating an example of an operation flow of a process executed by a network layer processor according to an embodiment of the present invention when the self node has been activated.

FIG. 11 is a flowchart illustrating an example of an operation flow of a process executed by a network layer processor according to an embodiment of the present invention when the self node has been activated.

In operation S51, the network layer processor 30 determines other nodes to be accessed with reference to the node registration file 30B and connects to each of the determined node.

In operation S52, the network layer processor 30 receives a list (referred to as a key list) of a data keys of shared data stored in the network layer map 30A of each node from each of the connected nodes.

In operation S53, the network layer processor 30 generates a list (referred to as a key-node list) including a node identifier of a connected node in association with a data keys registered in the connected node.

In operation S54, the network layer processor 30 receives a data keys stored in the local instance map 20A of the self node from the local instance processor 20 to generate a key list of the self node.

In operation S55, the network layer processor 30 transmits the key list of the self node to each of the connected nodes.

In operation S56, the network layer processor 30 searches for a data keys matched with a data keys registered in the self node in the key-node list.

In operation S57, the network layer processor 30 determines whether the key-node list contains any a data keys matched with the data keys registered in the self node. When the key-node list contains no a data keys matched with the data keys registered in the self node ("No" in operation S57), the network layer processor 30 terminates the process.

In operation S58, when the key-node list contains some a data keys matched with the data keys registered in the self node ("Yes" in operation S57), synchronization of the value of the shared data identified by each matched a data key is made between the self node and the other node in which the matched a data key is registered. Specifically, the network layer processor 30 advances the process to that illustrated in FIG. 14 discussed later which is the same process executed upon receiving from the local instance processor 20 an update notification conveying that the value of the shared data stored in the local instance map 20A has been updated. Then, the network layer processor 30 terminates the process.

Figure 12:
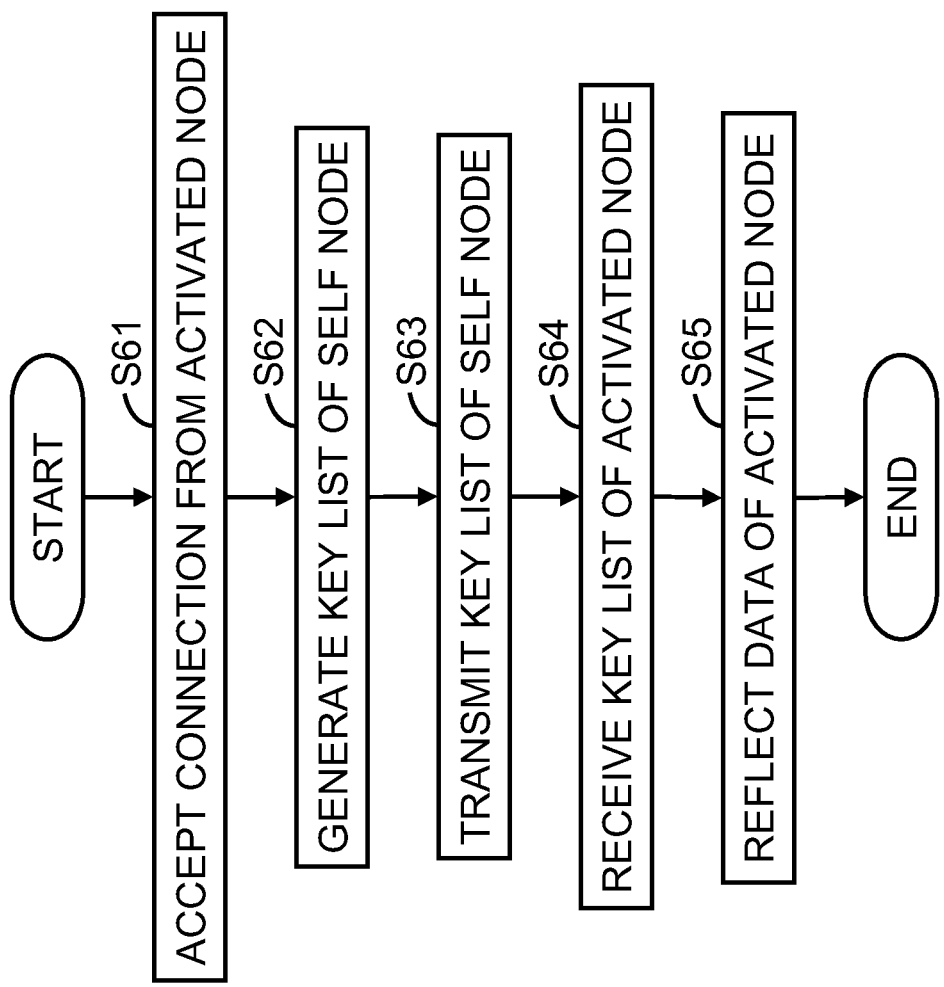
FIG. 12 is a flowchart illustrating an example of an operation flow of a process executed by a network layer processor according to an embodiment of the present invention when another node has been activated.

FIG. 12 is a flowchart illustrating an example of an operation flow of a process executed by a network layer processor according to an embodiment of the present invention when another node has been activated. Note that, at this time, the activated node executes the above-discussed process illustrated in FIG. 11.

In operation S61, the network layer processor 30 accepts connection from the activated node.

In operation S62, the network layer processor 30 receives a data keys stored in the local instance map 20A of the self node from the local instance processor 20 to generate a key list of the self node.

In operation S63, the network layer processor 30 transmits the key list of the self node to the activated node.

In operation S64, the network layer processor 30 receives a key list of the activated node.

In operation S65, when some of a data keys contained in the key list of the activated node match a data keys contained in the network layer map 30A, the network layer processor 30 reflects data regarding the activated node to the network layer map 30A, that is, the network layer processor 30 adds the node identifier of the activated node to the "SHARER NODES" field 30A2 corresponding to each of the matched a data keys. Then, the network layer processor 30 terminates the process.

Figure 13:
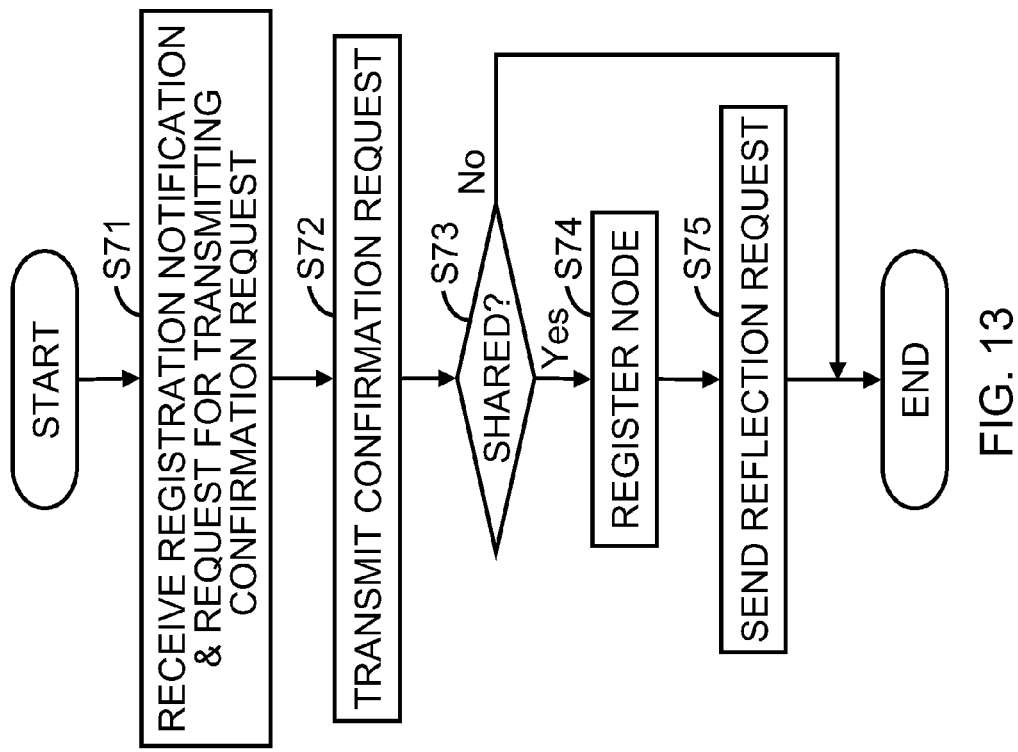
FIG. 13 is a flowchart illustrating an example of an operation flow of a process executed by a network layer processor according to an embodiment of the present invention upon receiving a registration notification from a local instance processor.

FIG. 13 is a flowchart illustrating an example of an operation flow of a process executed by a network layer processor according to an embodiment of the present invention upon receiving a registration notification from a local instance processor. This process is executed by the network layer processor 30 after the local instance processor 20 has executed operation S5 of the process illustrated in FIG. 6.

In operation S71, the network layer processor 30 receives from the local instance processor 20 a registration notification conveying that a value of new shared data is stored in the local instance map 20A, with the data key as an argument. The network layer processor 30 also receives a request for transmitting a confirmation request for confirming whether the data key of the shared data is registered in another node.

In operation S72, the network layer processor 30 determines other nodes to be accessed with reference to the node registration file 30B and connects to each of the determined node. The network layer processor 30 transmits to each of the connected nodes the confirmation request for confirming whether the data key of the shared data is registered in the connected node. Each connected node which has received the confirmation request returns a data keys stored in the local instance map 20A.

In operation S73, the network layer processor 30 determines whether the data key as the argument is shared with each of the connected nodes, i.e., registered in each of the connected nodes, in accordance with the data keys returned from the each of the connected nodes in response to the confirmation request. When the data key is not shared with any nodes ("No" in operation S73), network layer processor 30 terminates the process.

In operation S74, when the data key is shared with some nodes ("Yes" in operation S73), the network layer processor 30 registers the sharer nodes, that is, the network layer processor 30 stores node identifiers of the sharer nodes in the network layer map 30A in association with the data key.

In operation S75, the network layer processor 30 sends the local instance processor 20 a request to synchronize the value of the shared data stored in the local instance map 20A with the value of the shared data registered in the sharer nodes. Specifically, the network layer processor 30 transmits a reflection request to the local instance processor 20 with the data key and the value of the shared data registered in the sharer node as arguments. Upon receiving this reflection request, the local instance processor 20 executes the process illustrated in FIG. 9 while regarding the value of the shared data registered in the sharer node as the update value. Then, the network layer processor 30 terminates the process.

Figure 14:
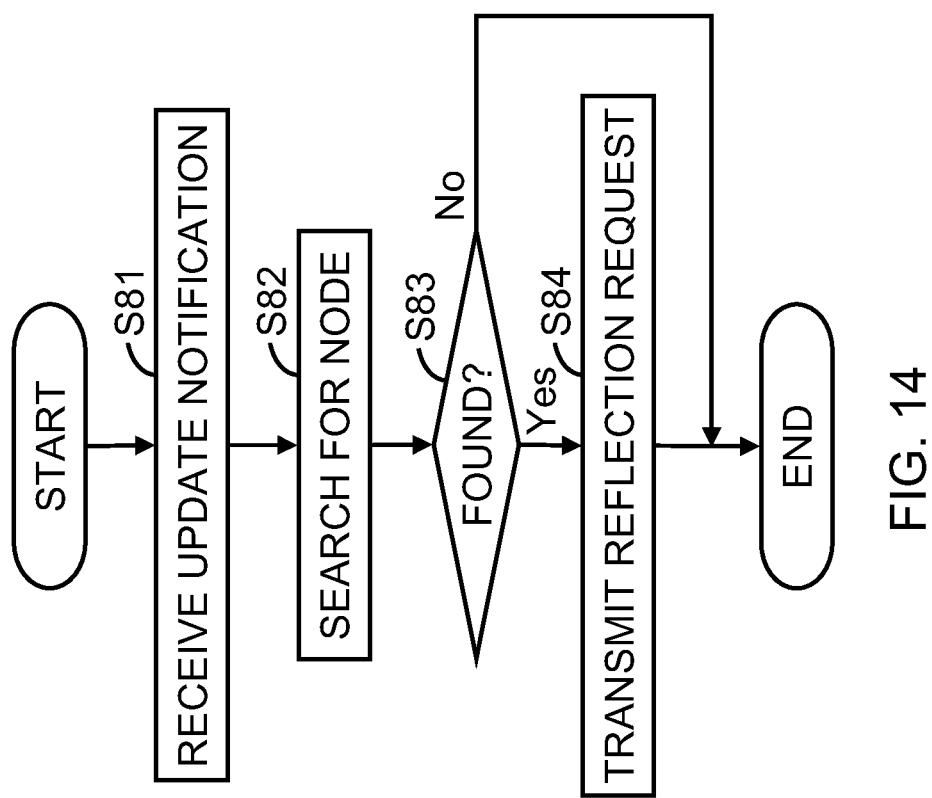
FIG. 14 is a flowchart illustrating an example of an operation flow of a process executed by a network layer processor according to an embodiment of the present invention upon receiving an update notification from a local instance processor.

FIG. 14 is a flowchart illustrating an example of an operation flow of a process executed by a network layer processor according to an embodiment of the present invention upon receiving an update notification from a local instance processor. This process is executed by the network layer processor 30 after the local instance processor 20 has executed operation S27 of the process illustrated in FIG. 8.

In operation S81, the network layer processor 30 receives from the local instance processor 20 an update notification conveying that the value of the shared data stored in the local instance map 20A has been updated, with the data key and the update value of the shared data as arguments. The network layer processor 30 also receives a request for transmitting a reflection request for reflecting the update to another node.

In operation S82, the network layer processor 30 searches, in the network layer map 30A, for anther node in which the data key as the argument is registered.

In operation S83, the network layer processor 30 determines in response to the search result in operation S82, whether any nodes in which the data key as the argument is registered have been found. When no node in which the data key as the argument is registered has been found ("No" in operation S83), the network layer processor 30 terminates the process.

In operation S84, when some nodes in which the data key as the argument is registered have been found ("Yes" in operation S83), the network layer processor 30 transmits to each of the found nodes a reflection request for reflecting the update vale to the value of the shared data stored in the local instance map 20A of the found node, with the data key and the update value as arguments. Then, the network layer processor 30 terminates the process.

Figure 15:
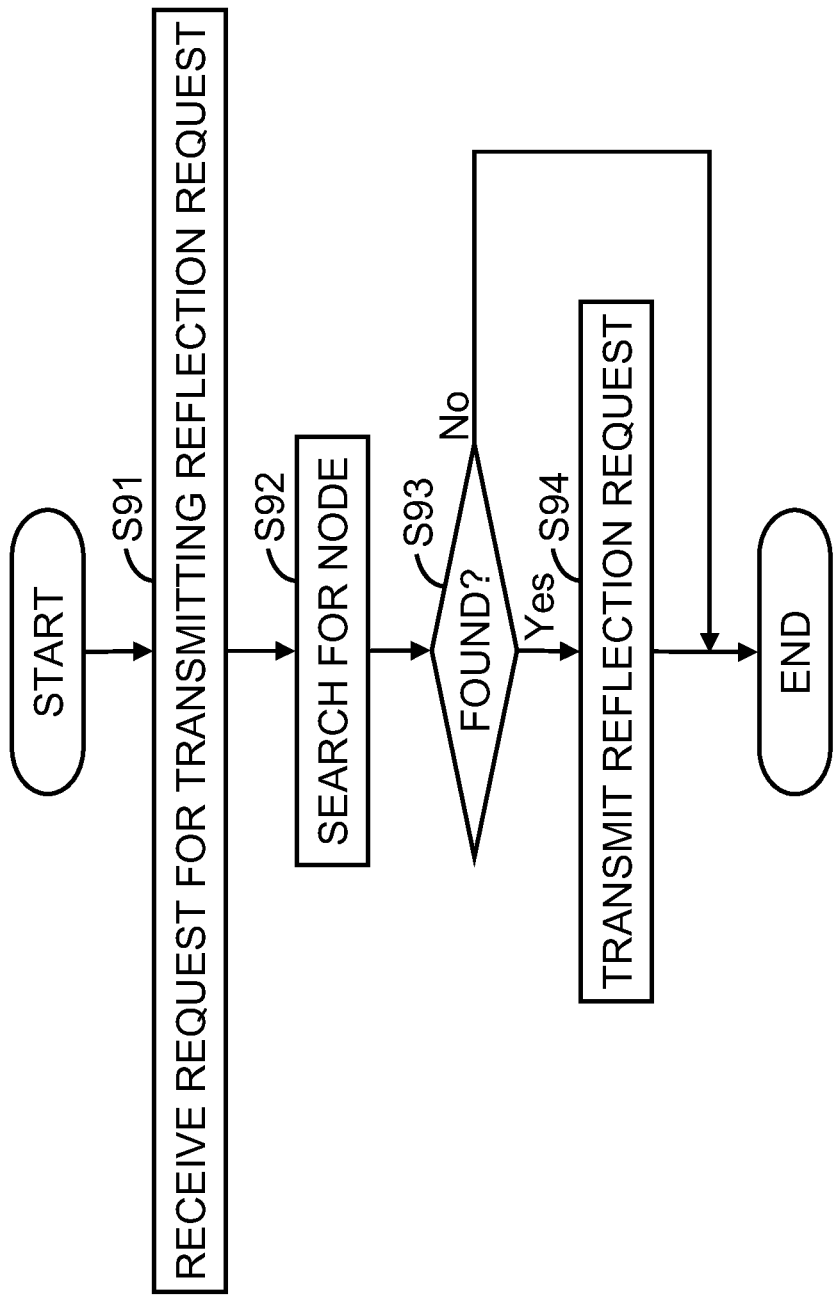
FIG. 15 is a flowchart illustrating an example of an operation flow of a process executed by a network layer processor according to an embodiment of the present invention upon receiving a request for transmitting a reflection request to a node other than the source node from which the reflection request has been transmitted.

FIG. 15 is a flowchart illustrating an example of an operation flow of a process executed by a network layer processor according to an embodiment of the present invention upon receiving a request for transmitting a reflection request to a node other than the source node from which the reflection request has been transmitted. This process is executed after operation S36 illustrated in FIG. 9 executed by the local instance processor 20.

In operation S91, the network layer processor 30 receives from the local instance processor 20 the request for transmitting the reflection request, with the data key, the update value of the shared data, and the node identifier of the source node from which the reflection request has been transmitted, as arguments.

In operation S92, the network layer processor 30 searches, in the network layer map 30A, for another node in which the data key as the argument is registered.

In operation S93, the network layer processor 30 determines in response to the search result in operation S92, whether any nodes in which the data key as the argument is registered have been found. When no node in which the data key as the argument is registered has been found ("No" in operation S93), the network layer processor 30 terminates the process.

In operation S94, when some nodes in which the data key as the argument is registered have been found ("Yes" in operation S93), the network layer processor 30 transmits to each of the found nodes except the source node the reflection request for reflecting the update vale to the value of the shared data stored in the local instance map 20A of the found node, with the data key and the update value as arguments. Then, the network layer processor 30 terminates the process.

Figure 16:
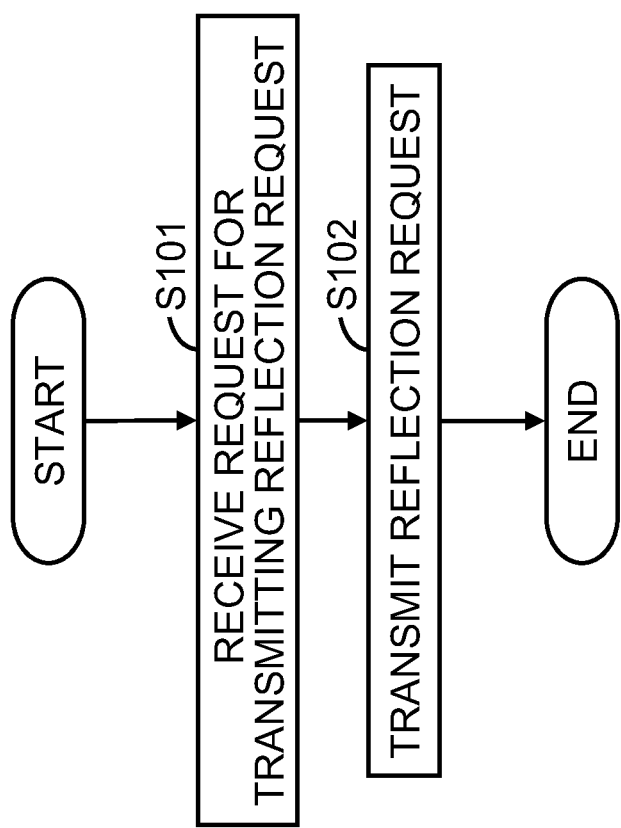
FIG. 16 is a flowchart illustrating an example of an operation flow of a process executed by a network layer processor according to an embodiment of the present invention upon receiving a request for transmitting a reflection request to the source node.

FIG. 16 is a flowchart illustrating an example of an operation flow of a process executed by a network layer processor according to an embodiment of the present invention upon receiving a request for transmitting a reflection request to the source node. This process is executed after operation S38 illustrated in FIG. 9 executed by the local instance processor 20.

In operation S101, the network layer processor 30 receives from the local instance processor 20 the request for transmitting the reflection request, with the data key, the update value of the shared data, and the node identifier of the source node from which the reflection request has been transmitted, as arguments.

In operation S102, the network layer processor 30 transmits the reflection request to the source node. Then, the network layer processor 30 terminates the process.

Figure 17:
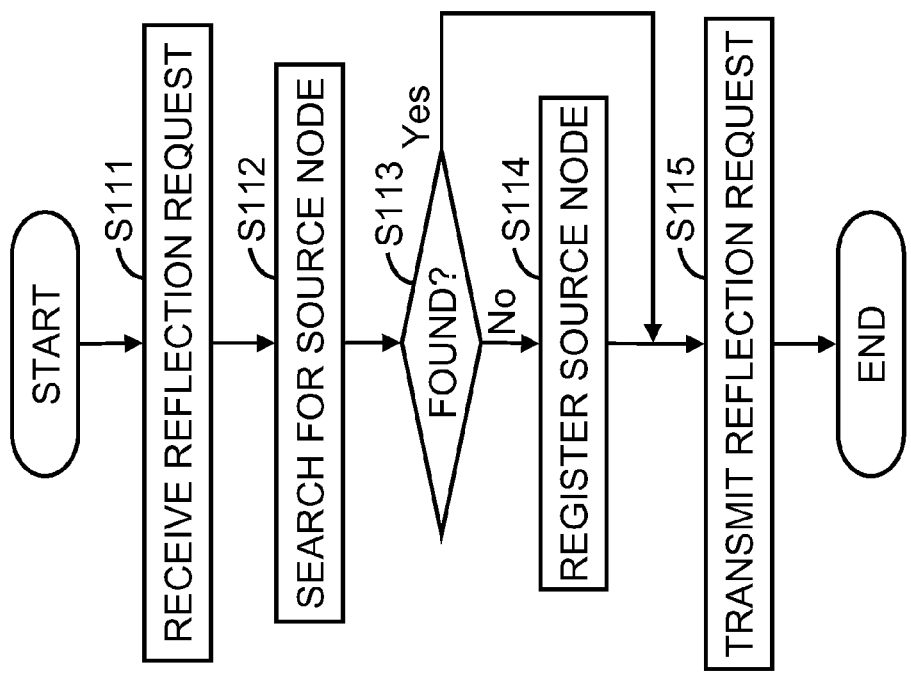
FIG. 17 is a flowchart illustrating an example of an operation flow of a process executed by a network layer processor according to an embodiment of the present invention upon receiving a reflection request from a node which has updated a value of shared data.

FIG. 17 is a flowchart illustrating an example of an operation flow of a process executed by a network layer processor according to an embodiment of the present invention upon receiving a reflection request from a node which has updated a value of shared data.

In operation S111, the network layer processor 30 receives a reflection request from a node in which the value of the shared data has been updated, with the data key and the update value of the shared data as arguments.

In operation S112, the network layer processor 30 searches, in the network layer map 30A, for the source node which has transmitted the reflection request.

In operation S113, the network layer processor 30 determines in response to the search result in operation S112, whether the source node has been found. When the source node transmitted the reflection request has been found in the network layer map 30A ("Yes" in operation S113), the network layer processor 30 advances the process to operation S115.

In operation S114, when the source node transmitted the reflection request has not been found in the network layer map 30A ("No" in operation S113), the network layer processor 30 registers the source node, that is, the network layer processor 30 stores the node identifier of the source node in the network layer map 30A in association with the data key.

In operation S115, the network layer processor 30 sends the reflection request to the local instance processor 20 with the data key and the update value as arguments, and terminates the process. The local instance processor 20 receives this reflection request and executes the process illustrated in FIG. 9.

Figure 18:
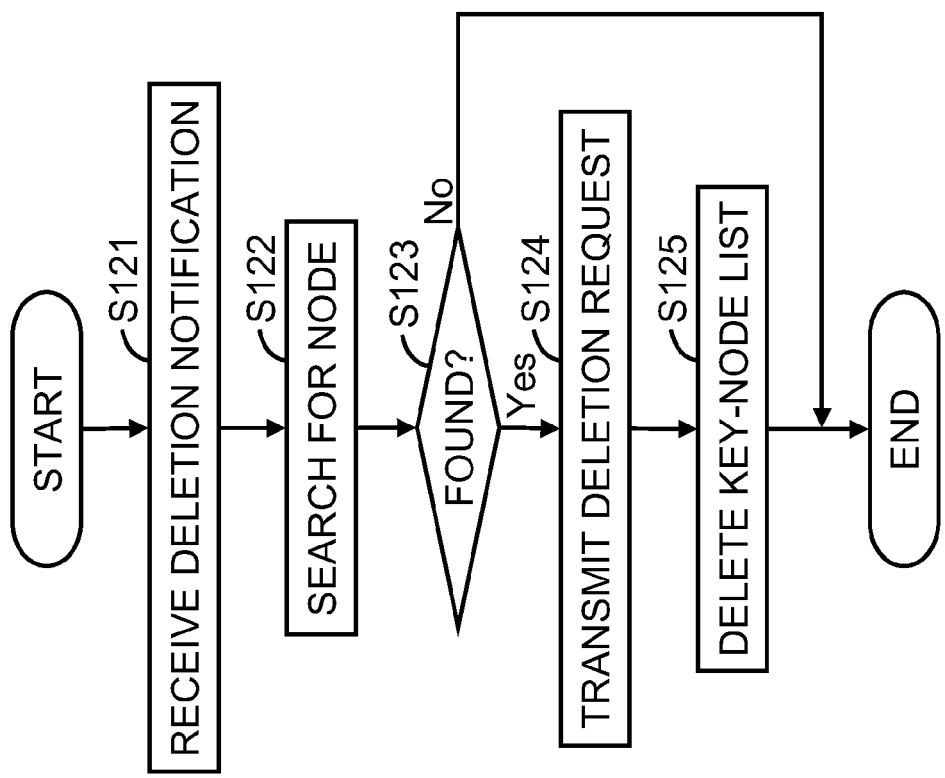
FIG. 18 is a flowchart illustrating an example of an operation flow of a process executed by a network layer processor according to an embodiment of the present invention upon receiving a deletion notification from a local instance processor.

FIG. 18 is a flowchart illustrating an example of an operation flow of a process executed by a network layer processor according to an embodiment of the present invention upon receiving a deletion notification from a local instance processor.

In operation S121, the network layer processor 30 receives from the local instance processor 20 a deletion notification conveying that the data stored in the local instance map 20A has been deleted, with the data key as an argument.

In operation S122, the network layer processor 30 searches for nodes stored in the network layer map 30A in association with the data key.

In operation S123, the network layer processor 30 determines in response to the search result in operation S122, whether any nodes stored in the network layer map 30A in association with the data key have been found. When no node stored in the network layer map 30A in association with the data key has been found ("No" in operation S123), the network layer processor 30 terminates the process.

In operation S124, when some nodes stored in the network layer map 30A in association with the data key have been found ("Yes" in operation S123), the network layer processor 30 transmits to each of the found nodes a deletion request for deleting data regarding the self node.

In operation S125, the network layer processor 30 deletes the key-node list containing the data key from the network layer map 30A of the self node. Then, the network layer processor 30 terminates the process.

Examples of process sequence of a data sharing system according to the present invention will be discussed below. In the following concrete examples, it is assumed that at least node A and node B are connected to the network. The node registration file 30B of node A managed by the network layer processor 30 of node A stores the node identifier of node B. The node registration file 30B of node B managed by the network layer processor 30 of node B stores the node identifier of node A.

Concrete Example 1

Data Distribution Between Nodes

In a concrete example 1, the following is realized.
(CE1-A) Previous Arrangement
CE1-A-1: Node A registers a value of shared data identified by a data key "X".
CE1-A-2: Node B registers a value of shared data identified by the data key "X".
(CE1-B) Data Transfer
CE1-B-1: Node A updates the value of the shared data identified by the data key "X" to "YYY".
CE1-B-2: Node B refers to the value of the shared data identified by the data key "X".
(CE1-C) Cleanup
CE1-C-1: Node A deletes data regarding the shared data identified by the data key "X".
CE1-C-2: Node B deletes data regarding the shared data identified by the data key "X".

Figure 19:
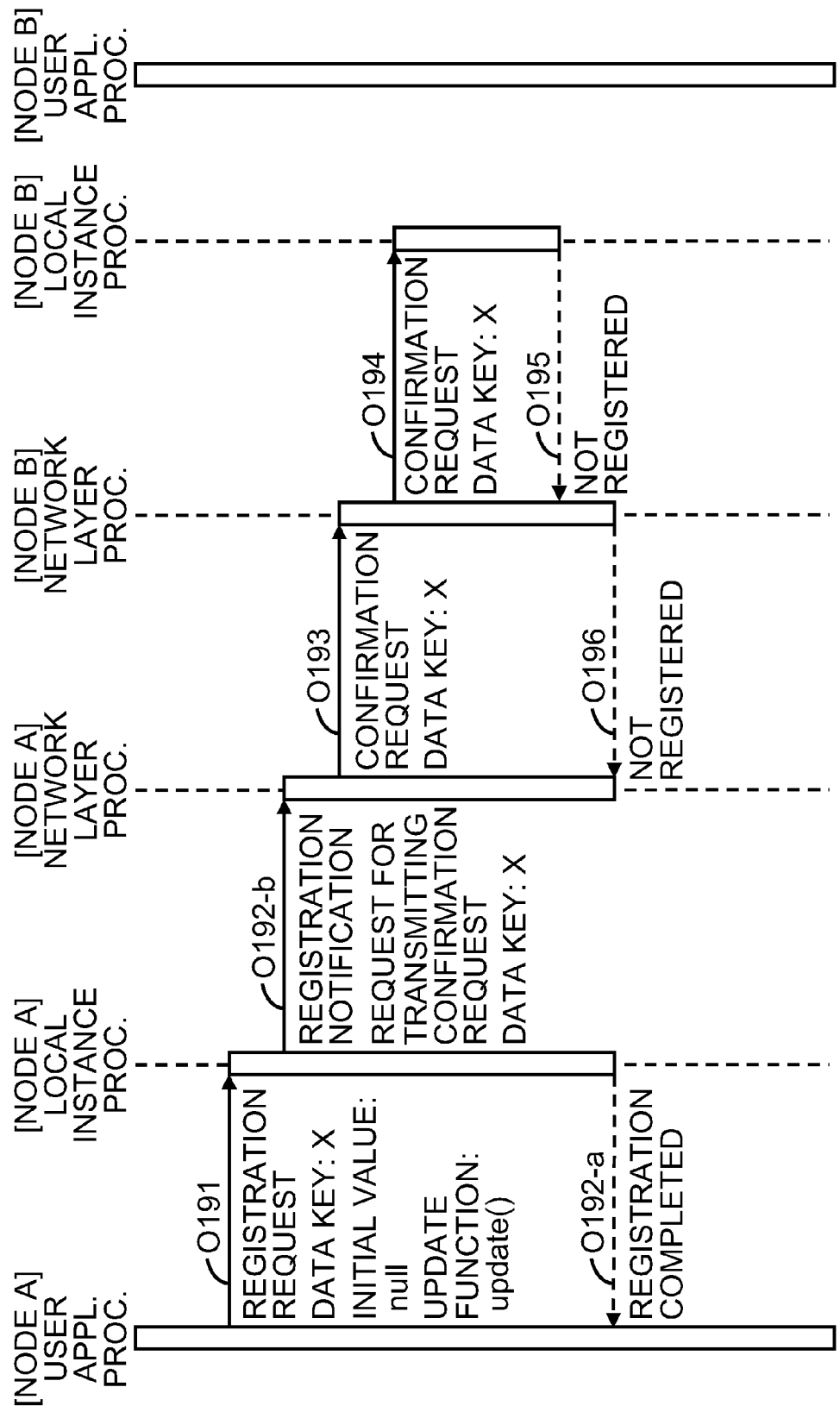
FIG. 19 is a diagram illustrating an example of a process sequence (CE1-A-1) for registering a value of shared data identified by a data key "X" in node A according to an embodiment of the present invention.

FIG. 19 is a diagram illustrating an example of a process sequence (CE1-A-1) for registering a value of shared data identified by the data key "X" in node A according to an embodiment of the present invention.

In operation O191, the user application processor (also denoted by "USER APPL. PROC." in the drawings) 10 of node A sends the local instance processor (also denoted by "LOCAL INSTANCE PROC." in the drawings) 20 of node A a registration request for registering new shared data. In this registration request, it is assumed that the data key of the shared data is "X", the initial value of the shared data is "null", and the update function for the shared data is "update( )" (the serialization function and the deserialization function are omitted for ease of discussion).

In operation O192-a, the local instance processor 20 of node A stores data regarding the shared data to be registered in the local instance map 20A of node A and notifies the user application processor 10 of node A that registration has been completed.

In operation O192-b, the local instance processor 20 of node A sends the network layer processor (also denoted by "NETWORK LAYER PROC." in the drawings) 30 of node A a registration notification conveying that new shared data has been registered. The local instance processor 20 of node A also sends the network layer processor 30 of node A a request for transmitting a confirmation request for confirming whether the data key "X" is registered in node B.

In operation O193, the network layer processor 30 of node A transmits the confirmation request to the network layer processor 30 of node B.

In operation O194, the network layer processor 30 of node B sends the confirmation request to the local instance processor 20 of node B. It is assumed in this example that the data key "X" is not stored in the local instance map 20A of node B at the moment.

In operation O195, the local instance processor 20 of node B returns the network layer processor 30 of node B an absence message conveying that the data key "X" is not registered.

In operation O196, the network layer processor 30 of node B returns the network layer processor 30 of node A the absence message conveying that the data key "X" is not registered. Since there is no another node storing the data key "X", node A terminates the process.

Figure 20:
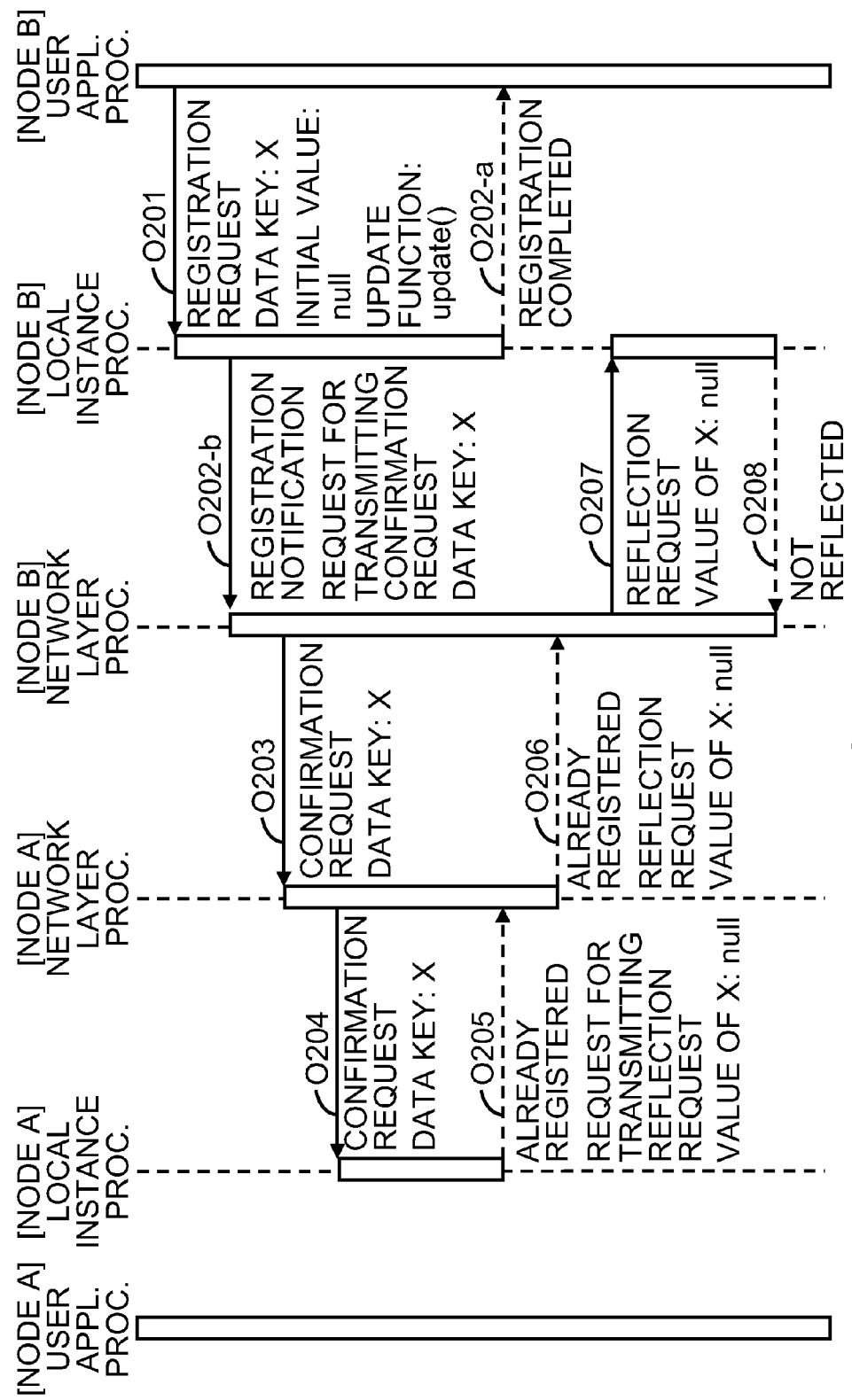
FIG. 20 is a diagram illustrating an example of a process sequence (CE1-A-2) for registering a value of shared data identified by a data key "X" in node B according to an embodiment of the present invention.

FIG. 20 is a diagram illustrating an example of a process sequence (CE1-A-2) for registering a value of shared data identified by a data key "X" in node B according to an embodiment of the present invention.

In operation O201, the user application processor 10 of node B sends a registration request for registering new shared data to the local instance processor 20 of node B. In this registration request, it is assumed that the data key of the shared data is "X", the initial value of the shared data is "null", and the update function for the shared data is "update( )".

In operation O202-a, the local instance processor 20 of node B stores data regarding the shared data to be registered in the local instance map 20A of node B and notifies the user application processor 10 of node B that registration has been completed.

In operation O202-b, the local instance processor 20 of node B sends the network layer processor 30 of node B a registration notification conveying that new shared data has been registered. The local instance processor 20 of node B also sends the network layer processor 30 of node B a request for transmitting a confirmation request for confirming whether the data key "X" is registered in node A.

In operation O203, the network layer processor 30 of node B transmits the confirmation request to the network layer processor 30 of node A.

In operation O204, the network layer processor 30 of node A sends the confirmation request to the local instance processor 20 of node A. Here, the data key "X" has been stored in the local instance map 20A of node A through the process A-1 discussed above.

In operation O205, the local instance processor 20 of node A returns the network layer processor 30 of node A an existence message conveying that the data key "X" has already been registered. The local instance processor 20 of node A also returns the network layer processor 30 of node A a request for transmitting a reflection request with the value "null", stored in the local instance map 20A of node A, as an update value of the shared data identified by the data key "X". The network layer processor 30 of node A stores in the network layer map 30A of node A the node identifier of the node B as a node sharing the shared data identified by the data key "X".

In operation O206, the network layer processor 30 of node A returns the network layer processor 30 of node B the existence message conveying that the data key "X" has already been registered. The network layer processor 30 of node A also returns the network layer processor 30 of node B the reflection request with the value "null" as an update value of the shared data identified by the data key "X". The network layer processor 30 of node B stores in the network layer map 30A of node B the node identifier of the node A as a node sharing the shared data identified by the data key "X".

In operation O207, the network layer processor 30 of node B sends the local instance processor 20 of node B the reflection request with the value "null" as an update value of the shared data identified by the data key "X".

In operation O208, since both of the value of the data key "X" stored in the local instance map 20A of the node B and the update value are "null", the local instance processor 20 of node B does not reflect the update but returns the network layer processor 30 of node B a neglect message conveying that the reflection has not been performed. Since there is no node sharing the shared data identified by the data key "X" except node A that is the source node from which the reflection request is transmitted, the reflection request is not further transmitted to another node from the network layer processor 30 of node B at this time, and node B terminates the process.

Figure 21:
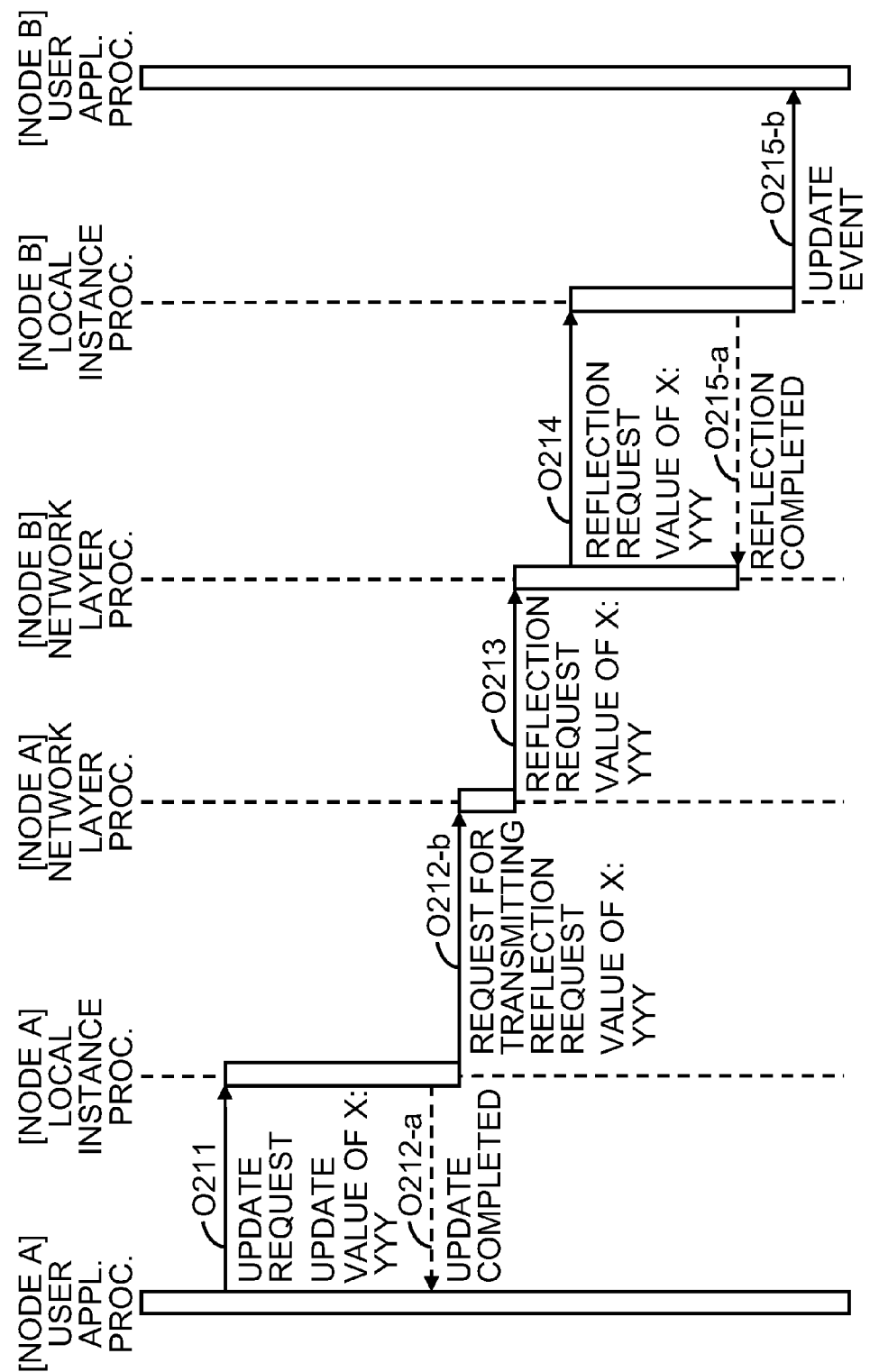
FIG. 21 is a diagram illustrating an example of a process sequence (CE1-B-1) for updating a value of shared data identified by a data key "X" is updated to "YYY" in node A according to an embodiment of the present invention.

FIG. 21 is a diagram illustrating an example of a process sequence (CE1-B-1) for updating a value of shared data identified by a data key "X" is updated to "YYY" in node A according to an embodiment of the present invention.

In operation O211, the user application processor 10 of node A sends the local instance processor 20 of node A an update request for updating the value of the shared data identified by the data key "X" to "YYY".

In operation O212-a, the local instance processor 20 of node A updates the value of the shared data identified by the data key "X" stored in the local instance map 20A of node A to the update value "YYY", and returns the user application processor 10 of node A a completion message conveying that the update has been completed.

In operation O212-b, the local instance processor 20 of node A sends the network layer processor 30 of node A a request for transmitting a reflection request for reflecting the update value to the value of the shared data identified by the data key "X" stored in another node.

In operation O213, the network layer processor 30 of node A transmits the reflection request to the network layer processor 30 of node B which is registered in node A, i.e., whose node identifier is stored in the network layer map 30A of node A, as a node sharing the shared data identified by the data key "X".

In operation O214, the network layer processor 30 of node B sends the local instance processor 20 of node B the reflection request for reflecting the update value to the value of the shared data identified by the data key "X" stored in the local instance map 20A of node B.

In operation O215-a, the local instance processor 20 of node B updates the value of the shared data identified by the data key "X" stored in the local instance map 20A of node B to the update value "YYY", and returns the network layer processor 30 of node B a completion message conveying that the reflection has been completed. Since there is no node sharing the shared data identified by the data key "X" except node A that is the source node from which the reflection request is transmitted, the reflection request is not further transmitted to another node from the network layer processor 30 of node B at this time.

In operation O215-b, the local instance processor 20 of node B sends the user application processor 10 of node B an update event for notifying that the value of the shared data identified by the data key "X" stored in the local instance map 20A of node B has been updated.

Figure 22:
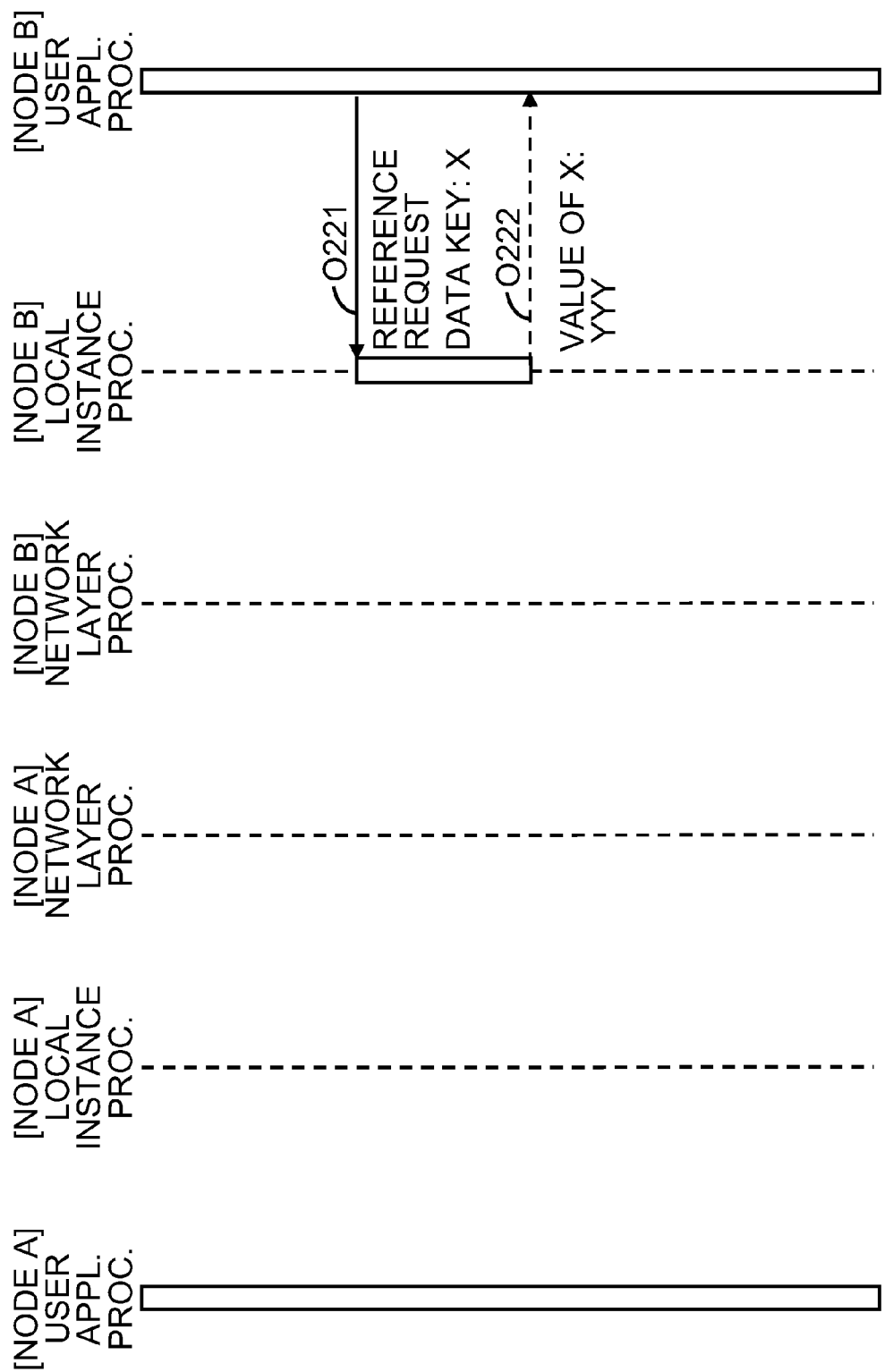
FIG. 22 is a diagram illustrating an example of a process sequence (CE1-B-2) for referring to a value of shared data identified by a data key "X" in node B according to an embodiment of the present invention.

FIG. 22 is a diagram illustrating an example of a process sequence (CE1-B-2) for referring to a value of shared data identified by a data key "X" in node B according to an embodiment of the present invention.

In operation O221, the user application processor 10 of node B sends the local instance processor 20 of node B a reference request for referring to the value of the shared data identified by the data key "X".

In operation O222, the local instance processor 20 of node B returns the user application processor 10 of node B the value "YYY" of the shared data identified by the data key "X" stored in the local instance map 20A of node B.

Figure 23:
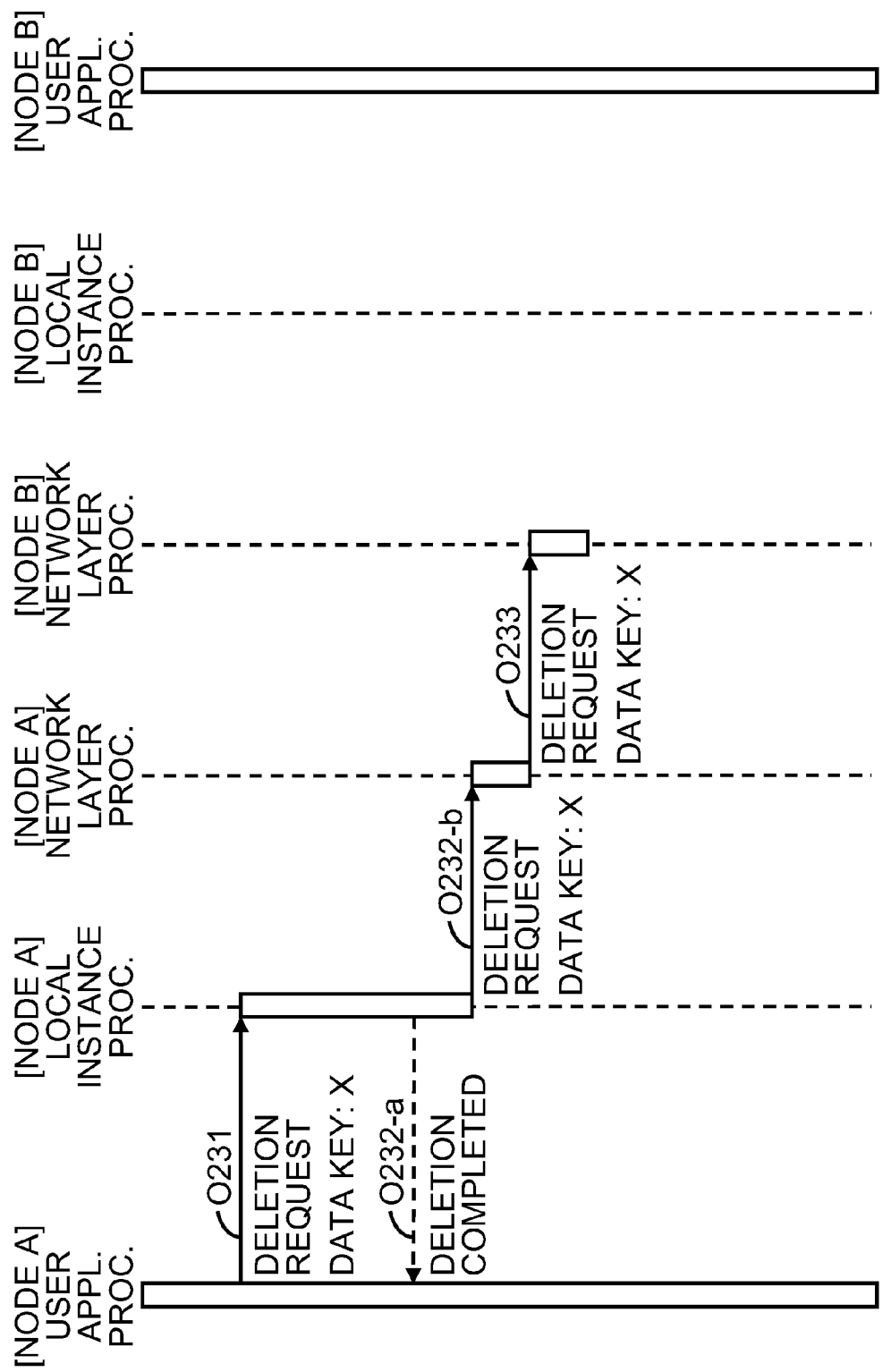
FIG. 23 is a diagram illustrating an example of a process sequence (CE1-C-1) for deleting data regarding shared data identified by a data key "X" in node A according to an embodiment of the present invention.

FIG. 23 is a diagram illustrating an example of a process sequence (CE1-C-1) for deleting data regarding shared data identified by a data key "X" in node A according to an embodiment of the present invention.

In operation O231, the user application processor 10 of node A sends the local instance processor 20 of node A a deletion request for deleting the data regarding the shared data identified by the data key "X" from the local instance map 20A of node A.

In operation O232-a, the local instance processor 20 of node A deletes the data regarding the shared data identified by the data key "X" from the local instance map 20A of node A, and returns the user application processor 10 of node A a notification conveying that the deletion has been completed.

In operation O232-b, the local instance processor 20 of node A sends the network layer processor 30 of node A a deletion request for deleting the data regarding the shared data identified by the data key "X" from the network layer map 30A of node A.

In operation O233, the network layer processor 30 of node A deletes the data regarding the data key "X" from the network layer map 30A of node A. The network layer processor 30 of node A transmits to the network layer processor 30 of node B which is registered in node A, i.e., whose node identifier is stored in the network layer map 30A of node A, as a node sharing the shared data identified by the data key "X", a deletion request for deleting the node identifier of node A stored in association with the data key "X" from the network layer map 30A of node B. In response to this, the network layer processor 30 of node B deletes the node identifier of node A stored in association with the data key "X" from the network layer map 30A of node B.

Figure 24:
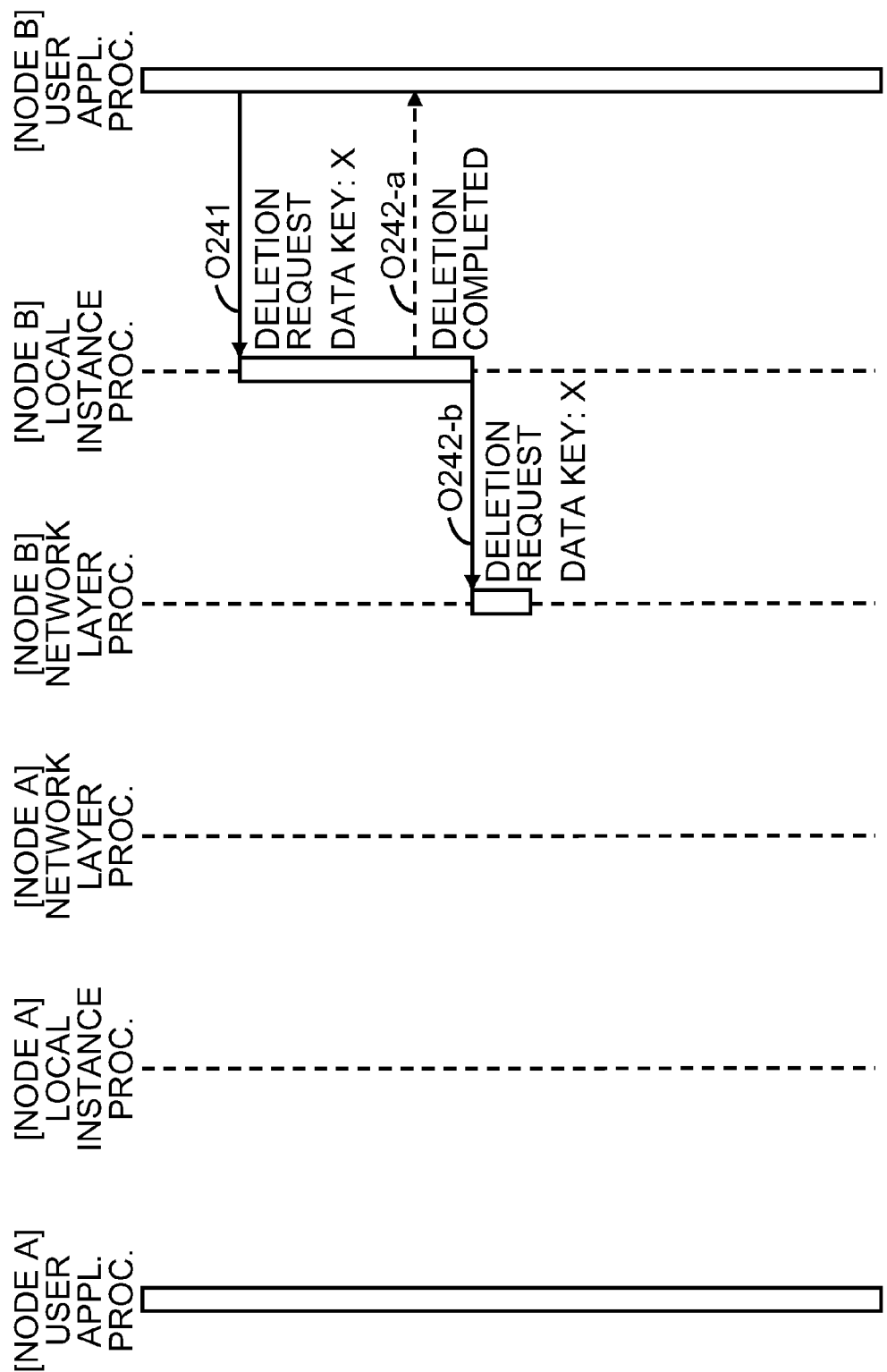
FIG. 24 is a diagram illustrating an example of a process sequence (CE1-C-2) for deleting data regarding shared data identified by a data key "X" in node B according to an embodiment of the present invention.

FIG. 24 is a diagram illustrating an example of a process sequence (CE1-C-2) for deleting data regarding shared data identified by a data key "X" in node B according to an embodiment of the present invention.

In operation O241, the user application processor 10 of node B sends the local instance processor 20 of node B a deletion request for deleting the data regarding the shared data identified by the data key "X" from the local instance map 20A of node B.

In operation O242-a, the local instance processor 20 of node B deletes the data regarding the shared data identified by the data key "X" from the local instance map 20A of node B, and returns the user application processor 10 of node B a notification conveying that the deletion has been completed.

In operation O242-b, the local instance processor 20 of node B sends the network layer processor 30 of node B a deletion request for deleting the data regarding the shared data identified by the data key "X" from the network layer map 30A of node B. The network layer processor 30 of node B deletes the data regarding the data key "X" from the network layer map 30A of node B. Since there is no node sharing the shared data identified by the data key "X", the network layer processor 30 of node B does not further transmit any deletion requests to other nodes at this time.

Concrete Example 2

Aggregation Between Nodes

In a concrete example 2, the following is realized.
(CE2-A) Previous Arrangement
CE2-A-1: Node A registers a value of shared data identified by a data key "M".
CE2-A-2: Node B registers a value of shared data identified by the data key "M".
(CE2-B) Aggregation
CE2-B-1: Node A updates the value of the shared data identified by the data key "M" to "13".
CE2-B-2: Node B updates the value of the shared data identified by the data key "M" to "9".
CE2-B-3: Node B refers to the value of the shared data identified by the data key "M".
(CE2-C) Cleanup
CE2-C-1: Node A deletes data regarding the shared data identified by the data key "M".
CE2-C-2: Node B deletes data regarding the shared data identified by the data key "M".

Figure 25:
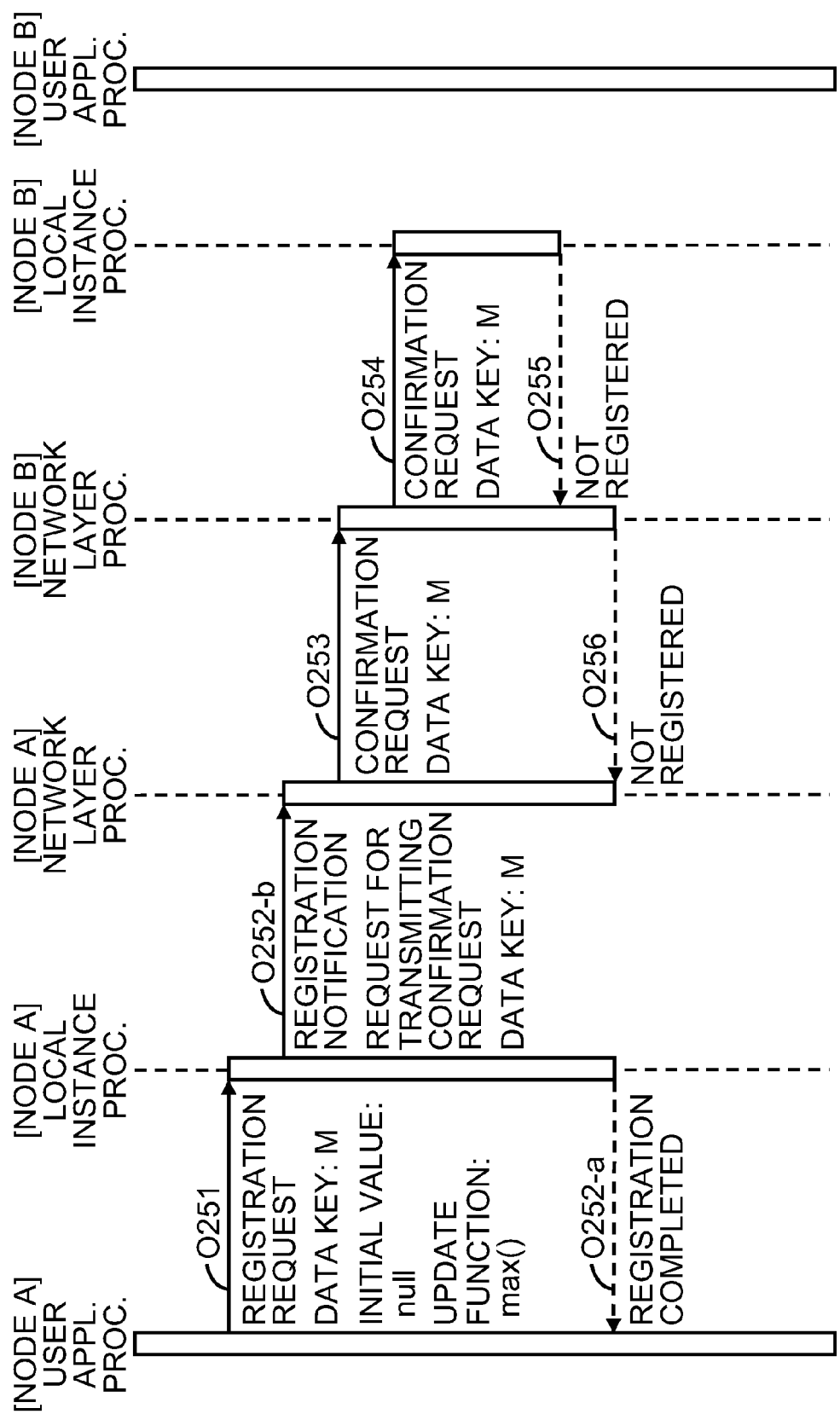
FIG. 25 is a diagram illustrating an example of a process sequence (CE2-A-1) for registering a value of shared data identified by a data key "M" in node A according to an embodiment of the present invention.

FIG. 25 is a diagram illustrating an example of a process sequence (CE2-A-1) for registering a value of shared data identified by a data key "M" in node A according to an embodiment of the present invention.

In operation O251, the user application processor 10 of node A sends the local instance processor 20 of node A a registration request for registering new shared data. In this registration request, it is assumed that the data key of the shared data is "M", the initial value of the shared data is "null", and the update function for the shared data is "max( )" for obtaining the maximum value as an aggregation result. Operations O252-a to O256 are similar to operations O192-a to O196 of the above-discussed concrete example 1 illustrated in FIG. 19, respectively, so that the discussion thereon is omitted.

Figure 26:
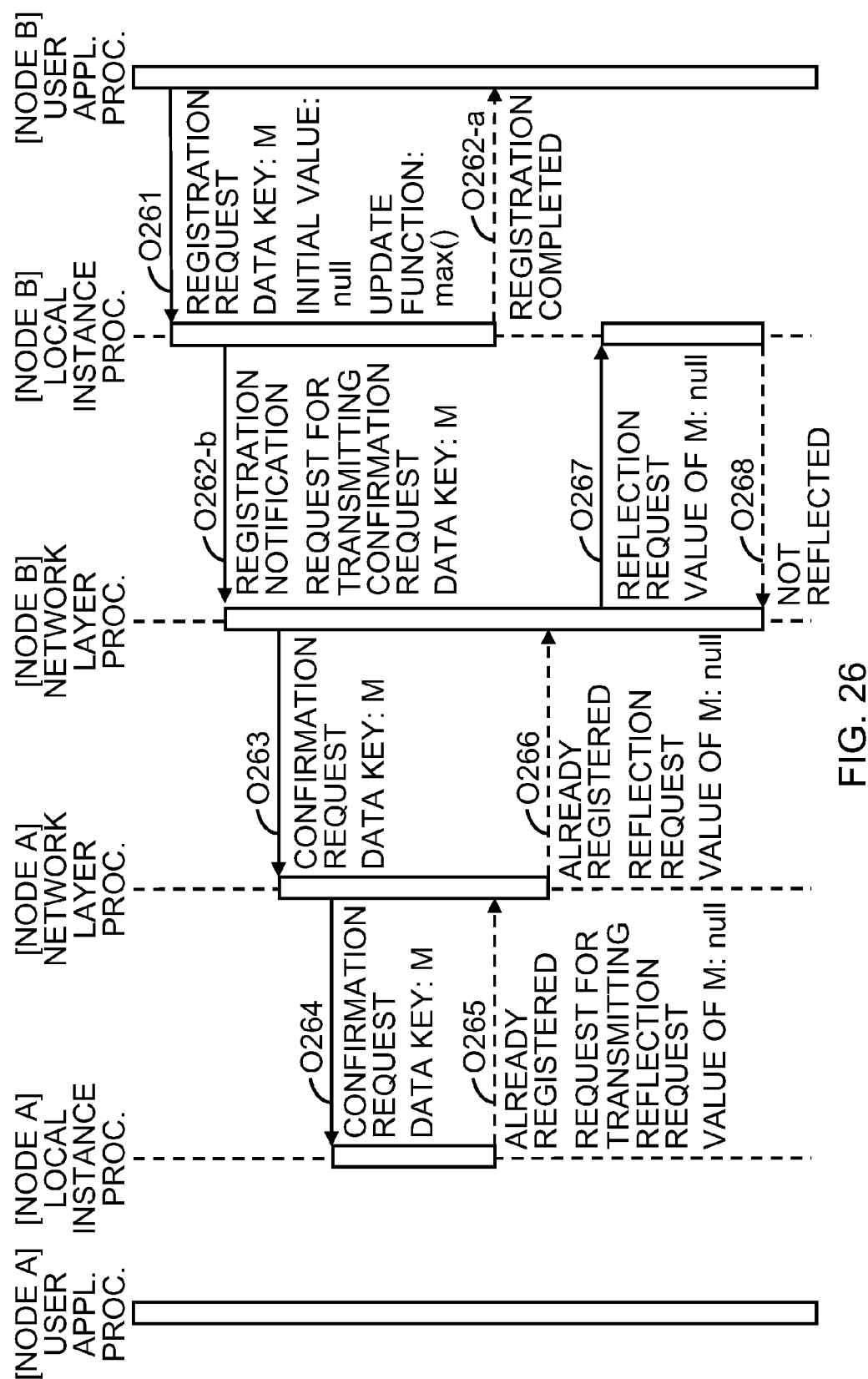
FIG. 26 is a diagram illustrating an example of a process sequence (CE2-A-2) for registering a value of shared data identified by a data key "M" in node B according to an embodiment of the present invention.

FIG. 26 is a diagram illustrating an example of a process sequence (CE2-A-2) for registering a value of shared data identified by a data key "M" in node B according to an embodiment of the present invention.

In operation O261, the user application processor 10 of node B sends the local instance processor 20 of node B a registration request for registering new shared data. In this registration request, it is assumed that the data key of the shared data is "M", the initial value of the shared data is "null", and the update function for the shared data is "max( )". Operations O262-a to O268 are similar to operations O202-a to O208 of the above-discussed concrete example 1 illustrated in FIG. 20, respectively, so that the discussion thereon is omitted.

Figure 27:
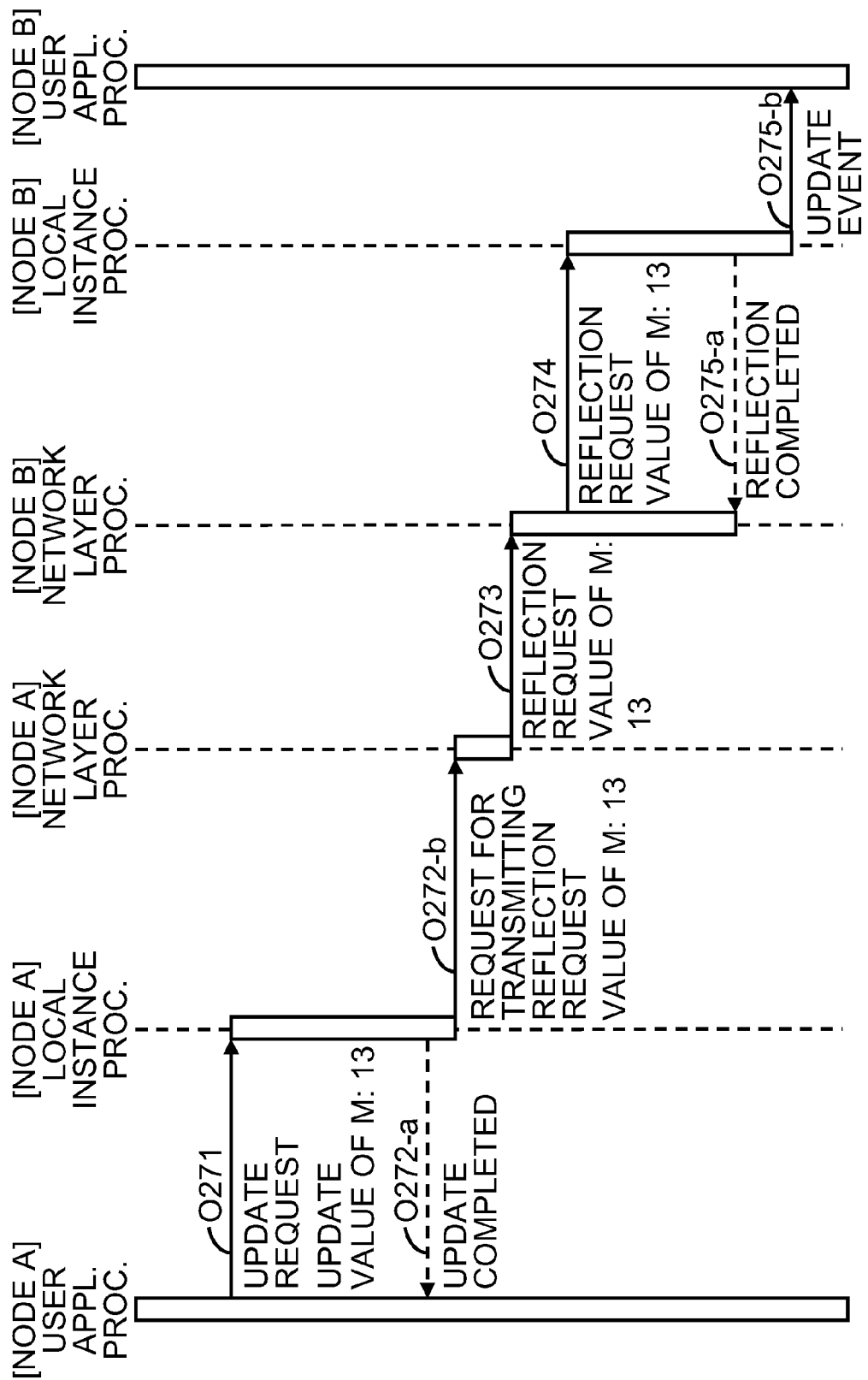
FIG. 27 is a diagram illustrating an example of a process sequence (CE2-B-1) for updating a value of shared data identified by a data key "M" to "13" in node A according to an embodiment of the present invention.

FIG. 27 is a diagram illustrating an example of a process sequence (CE2-B-1) for updating a value of shared data identified by a data key "M" to "13" in node A according to an embodiment of the present invention.

In operation O271, the user application processor 10 of node A sends the local instance processor 20 of node A an update request for updating the value of the shared data identified by the data key "M" to "13".

In operation O272-a, the local instance processor 20 of node A updates the value of the shared data identified by the data key "M" stored in the local instance map 20A of node A to "13". The local instance processor 20 of node A returns the user application processor 10 of node A a notification conveying that the update has been completed.

In operation O272-b, the local instance processor 20 of node A sends the network layer processor 30 of node A a request for transmitting a reflection request for reflecting the update to the value of the shared data identified by the data key "M" shared with another node.

In operation O273, the network layer processor 30 of node A transmits the reflection request to the network layer processor 30 of node B which is registered in node A, i.e., whose node identifier is stored in the network layer map 30A of node A, as a node sharing the shared data identified by the data key "M".

In operation O274, the network layer processor 30 of node B sends the local instance processor 20 of node B the reflection request for reflecting the update to the value of the shared data identified by the data key "M" stored in the local instance map 20A of node B.

In operation O275-a, since the value of the shared data identified by the data key "M" stored in the local instance map 20A of node B is "null" at the moment, and the update value "13" is preferred than "null" when compared in accordance with the update function "max( )", the local instance processor 20 of node B updates the value of the shared data identified by the data key "M" to the update value "13". The local instance processor 20 of node B returns the network layer processor 30 of node B a notification conveying that the reflection has been completed. Since there is no node sharing the shared data identified by the data key "M" except node A that is the source node from which the reflection request is transmitted, the reflection request is not further transmitted to another node from the network layer processor 30 of node B at this time.

In operation O275-b, the local instance processor 20 of node B sends the user application processor 10 of node B an update event for notifying that the value of the shared data identified by the data key "M" stored in the local instance map 20A of node B has been updated.

Figure 28:
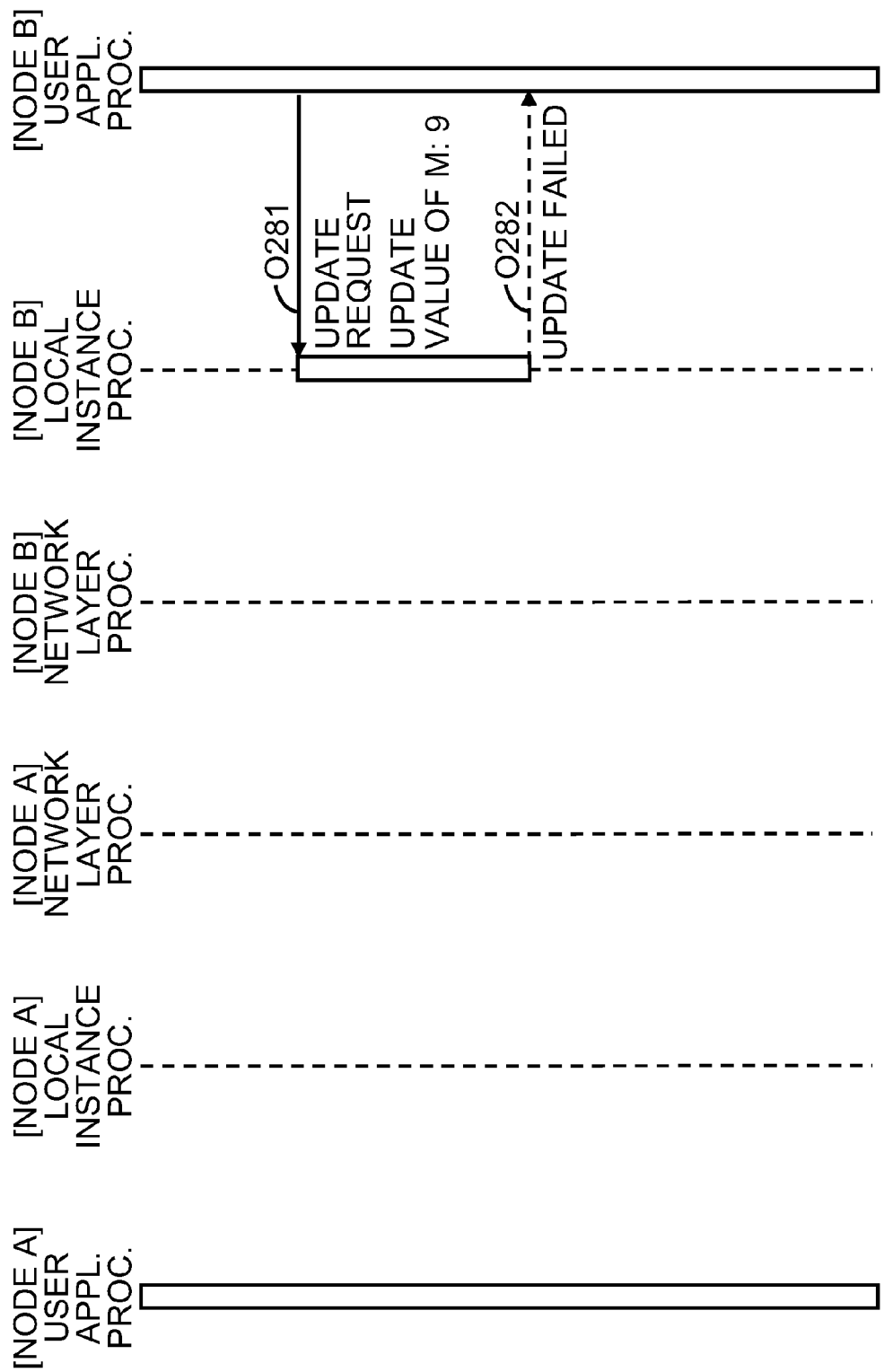
FIG. 28 is a diagram illustrating an example of a process sequence (CE2-B-2) for updating a value of shared data identified by a data key "M" to "9" in node B according to an embodiment of the present invention.

FIG. 28 is a diagram illustrating an example of a process sequence (CE2-B-2) for updating a value of shared data identified by a data key "M" to "9" in node B according to an embodiment of the present invention.

In operation O281, the user application processor 10 of node B sends the local instance processor 20 of node B an update request for updating the value of the shared data identified by the data key "M" to "9".

In operation O282, since the value of the shared data identified by the data key "M" stored in the local instance map 20A of node B is "13" at the moment, and the update value "9" is not preferred than "13" when compared in accordance with the update function "max( )", the local instance processor 20 of node B does not update the value of the shared data identified by the data key "M" to the update value "9". The local instance processor 20 of node B returns the user application processor 10 of node B a notification conveying that the update has been failed.

Figure 29:
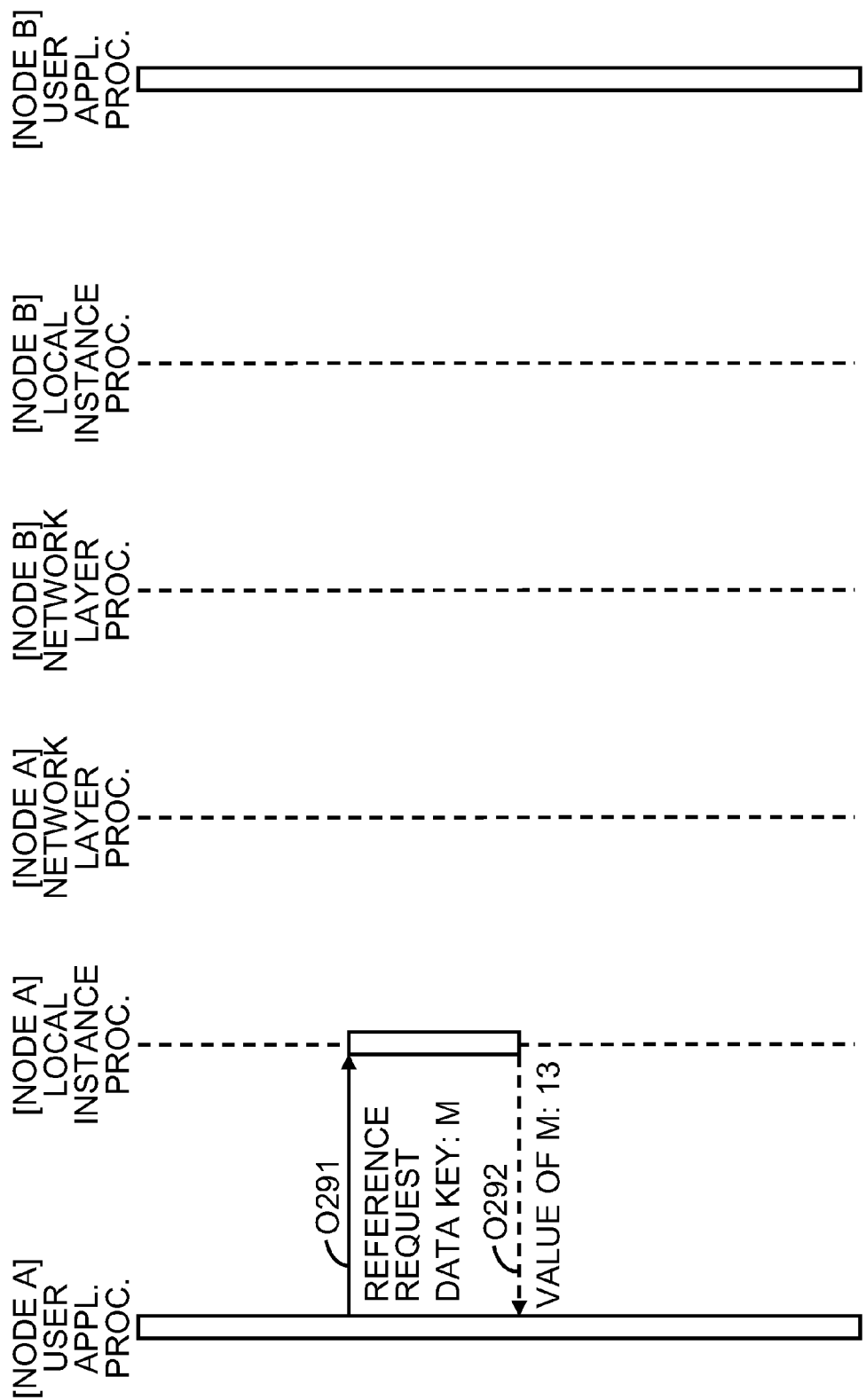
FIG. 29 is a diagram illustrating an example of a process sequence (CE2-B-3) for referring to a value of shared data identified by a data key "M" in node A according to an embodiment of the present invention.

FIG. 29 is a diagram illustrating an example of a process sequence (CE2-B-3) for referring to a value of shared data identified by a data key "M" in node A according to an embodiment of the present invention.

In operation O291, the user application processor 10 of node A sends the local instance processor 20 of node A a reference request for referring to the value of the shared data identified by the data key "M".

In operation O292, the local instance processor 20 of node A returns the user application processor 10 of node A the value "13" of the shared data identified by the data key "M" stored in the local instance map 20A of node A.

Figure 30:
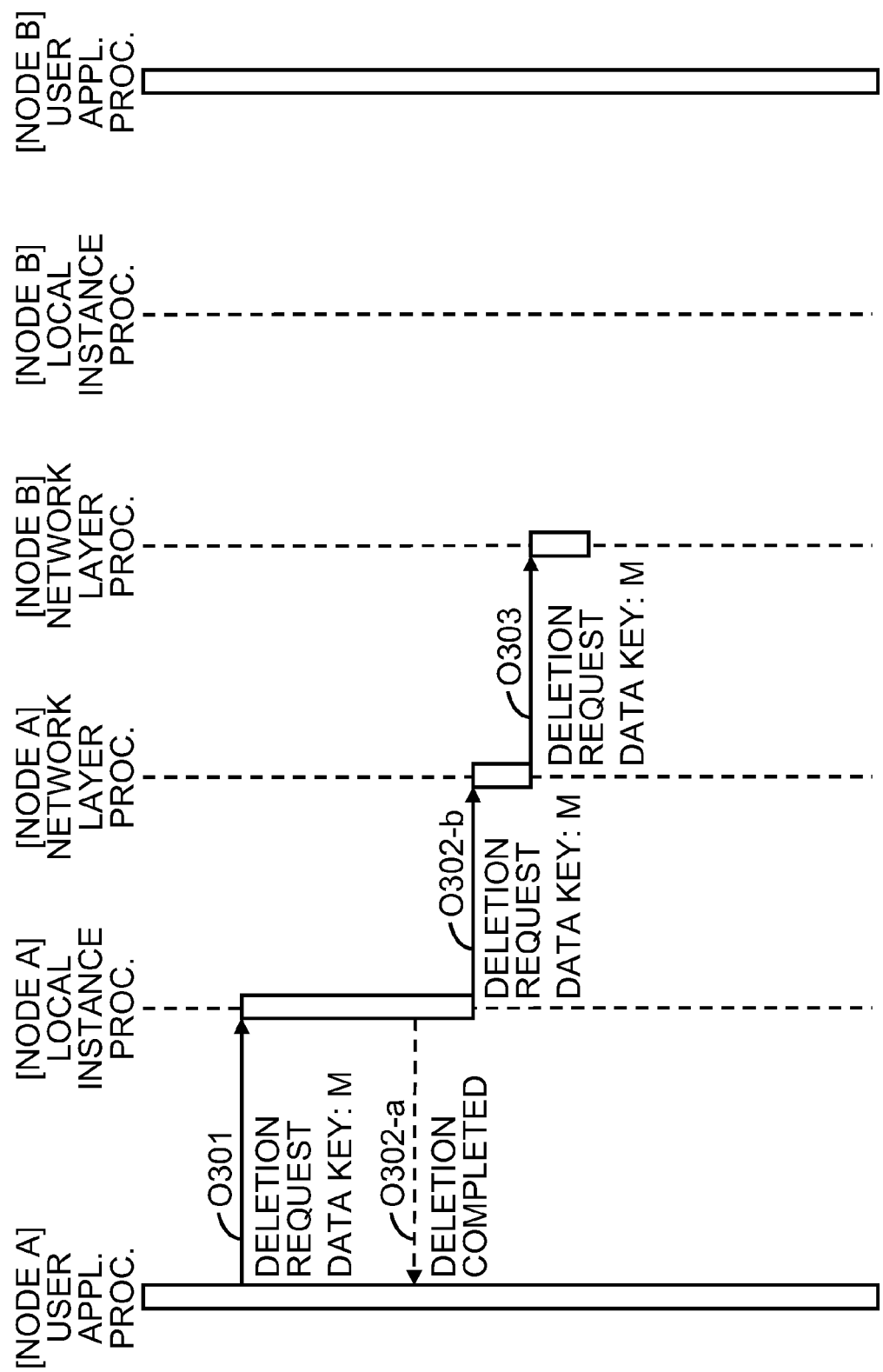
FIG. 30 is a diagram illustrating an example of a process sequence (CE2-C-1) for deleting data regarding shared data identified by the data key "M" in node A according to an embodiment of the present invention.

FIG. 30 is a diagram illustrating an example of a process sequence (CE2-C-1) for deleting data regarding shared data identified by the data key "M" in node A according to an embodiment of the present invention.

In operation O301, the user application processor 10 of node A sends the local instance processor 20 of node A a deletion request for deleting the data regarding the shared data identified by the data key "M" from the local instance map 20A of node A. Operations O302-a to O303 are similar to operations O232-a to O233 of the above-discussed concrete example 1 illustrated in FIG. 23, respectively, so that the discussion thereon is omitted.

Figure 31:
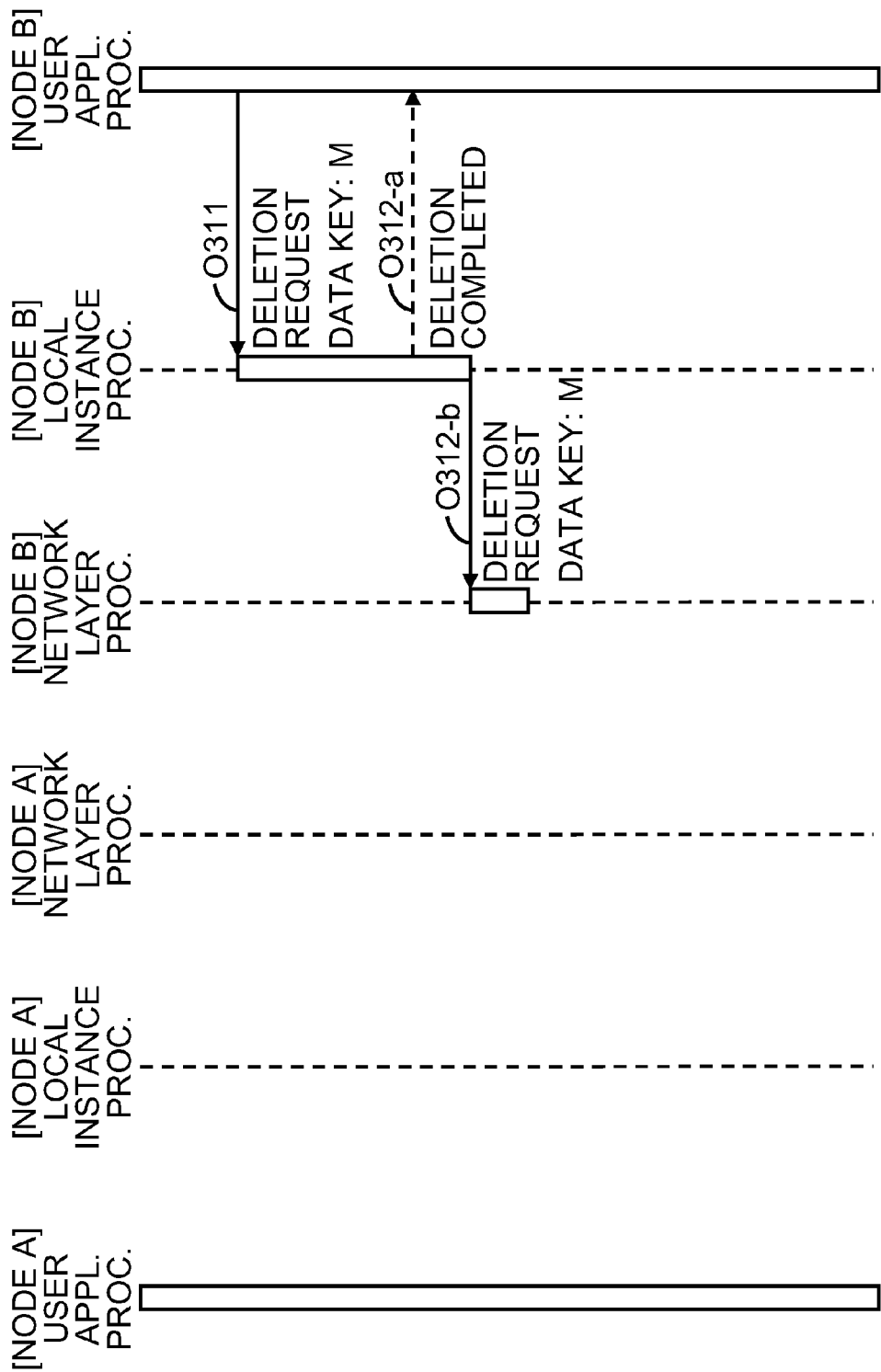
FIG. 31 is a diagram illustrating an example of a process sequence (CE2-C-2) for deleting data regarding shared data identified by the data key "M" in node B according to an embodiment of the present invention.

FIG. 31 is a diagram illustrating an example of a process sequence (CE2-C-2) for deleting data regarding shared data identified by the data key "M" in node B according to an embodiment of the present invention.

In operation O311, the user application processor 10 of node B sends the local instance processor 20 of node B a deletion request for deleting the data regarding the shared data identified by the data key "M" from the local instance map 20A of node B. Operations O312-a and O312-b are similar to operations O242-a and O242-b of the above-discussed concrete example 1 illustrated in FIG. 24, respectively, so that the discussion thereon is omitted.

Concrete Example 3

Synchronous Queuing

In a concrete example 3, the following is realized.
(CE3-A) Previous Arrangement
CE3-A-1: Node A registers a value of shared data identified by a data key "S".
CE3-A-2: Node B registers a value of shared data identified by the data key "S".
(CE3-B) Synchronous Queuing
CE3-B-1: Node A updates the value of the shared data identified by the data key "S" to be augmented by "A".
CE3-B-2: Node B updates the value of the shared data identified by the data key "S" to be augmented by "B".
CE3-B-3: Node A refers to the value of the shared data identified by the data key "S".
CE3-B-4: Node B refers to the value of the shared data identified by the data key "S".
(CE3-C) Cleanup
CE3-C-1: Node A deletes data regarding the shared data identified by the data key "S".
CE3-C-2: Node B deletes data regarding the shared data identified by the data key "S".

Figure 32:
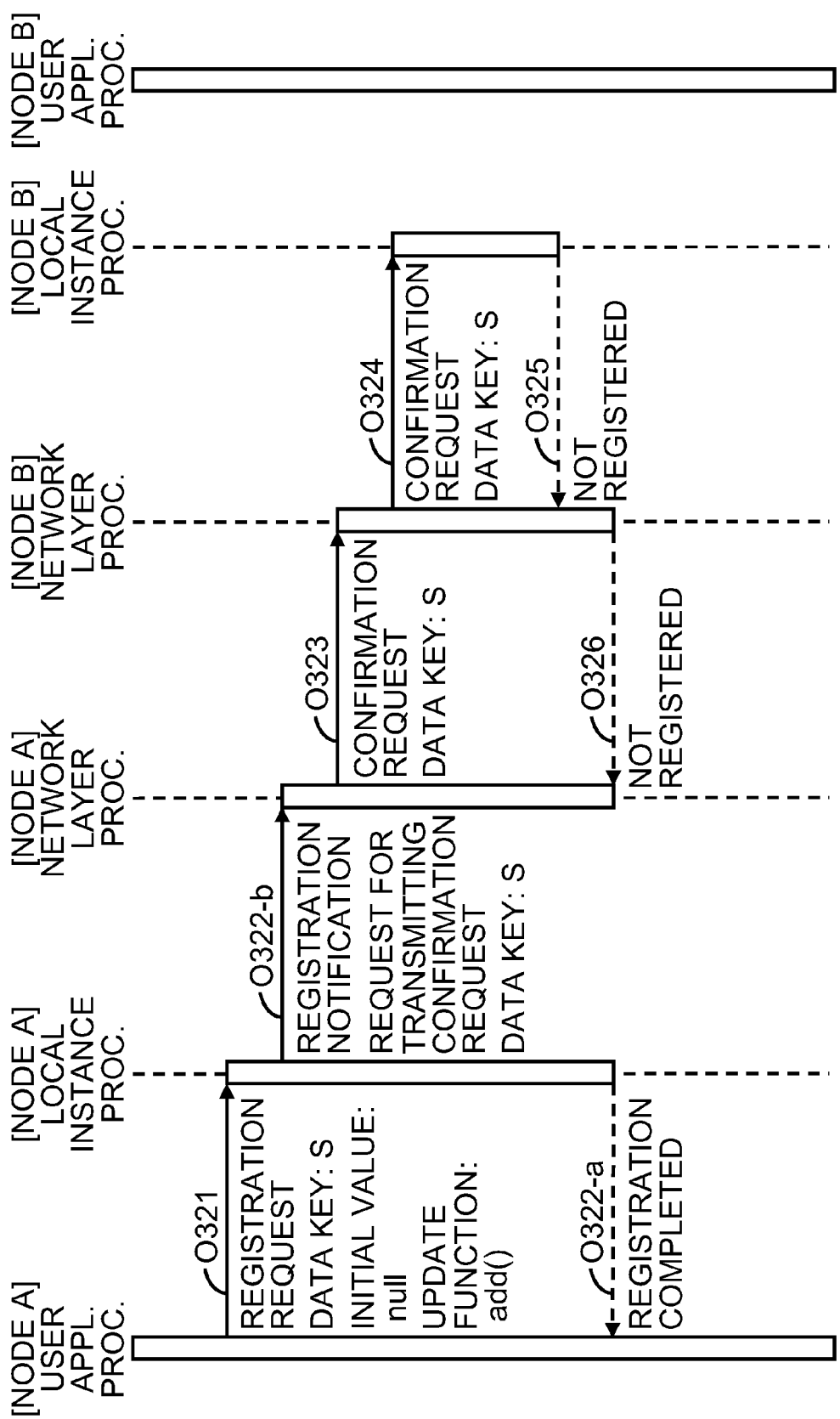
FIG. 32 is a diagram illustrating an example of a process sequence (CE3-A-1) for registering a value of shared data identified by a data key "S" in node A according to an embodiment of the present invention.

FIG. 32 is a diagram illustrating an example of a process sequence (CE3-A-1) for registering a value of shared data identified by a data key "S" in node A according to an embodiment of the present invention.

In operation O321, the user application processor 10 of node A sends the local instance processor 20 of node A a registration request for registering new shared data. In this registration request, it is assumed that the data key of the shared data is "S", the initial value of the shared data is "null", and the update function for the shared data is "add( )" for adding a new element to a set. Operations O322-a to O326 are similar to operations O192-a to O196 of the above-discussed concrete example 1 illustrated in FIG. 19, respectively, so that the discussion thereon is omitted.

Figure 33:
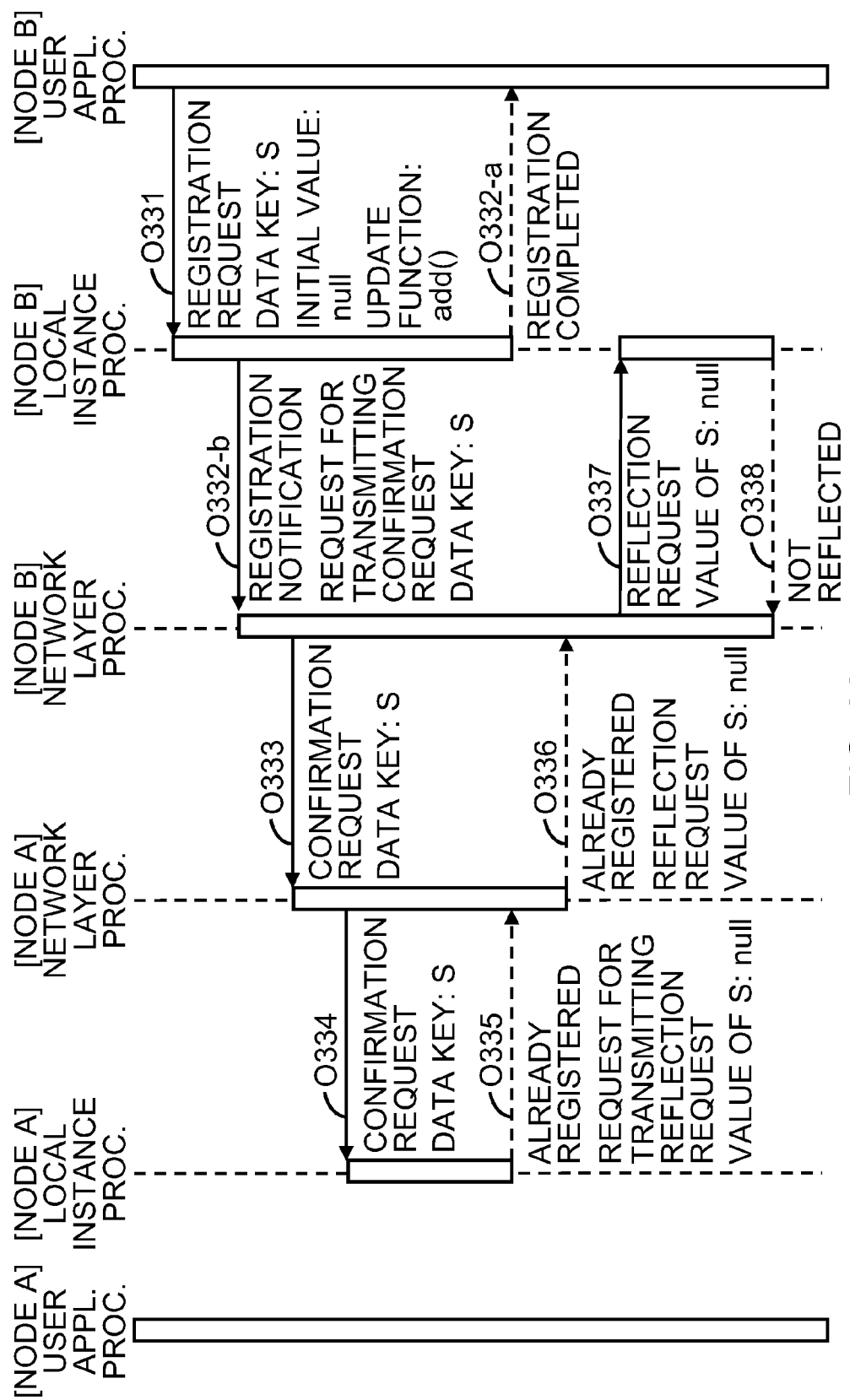
FIG. 33 is a diagram illustrating an example of a process sequence (CE3-A-2) for registering a value of shared data identified by the data key "S" in node B according to an embodiment of the present invention.

FIG. 33 is a diagram illustrating an example of a process sequence (CE3-A-2) for registering a value of shared data identified by the data key "S" in node B according to an embodiment of the present invention.

In operation O331, the user application processor 10 of node B sends the local instance processor 20 of node B a registration request for registering new shared data. In this registration request, it is assumed that the data key of the shared data is "S", the initial value of the shared data is "null", and the update function for the shared data is "add( )". Operations O332-a to O338 are similar to operations O202-a to O208 of the above-discussed concrete example 1 illustrated in FIG. 20, respectively, so that the discussion thereon is omitted.

Figure 34:
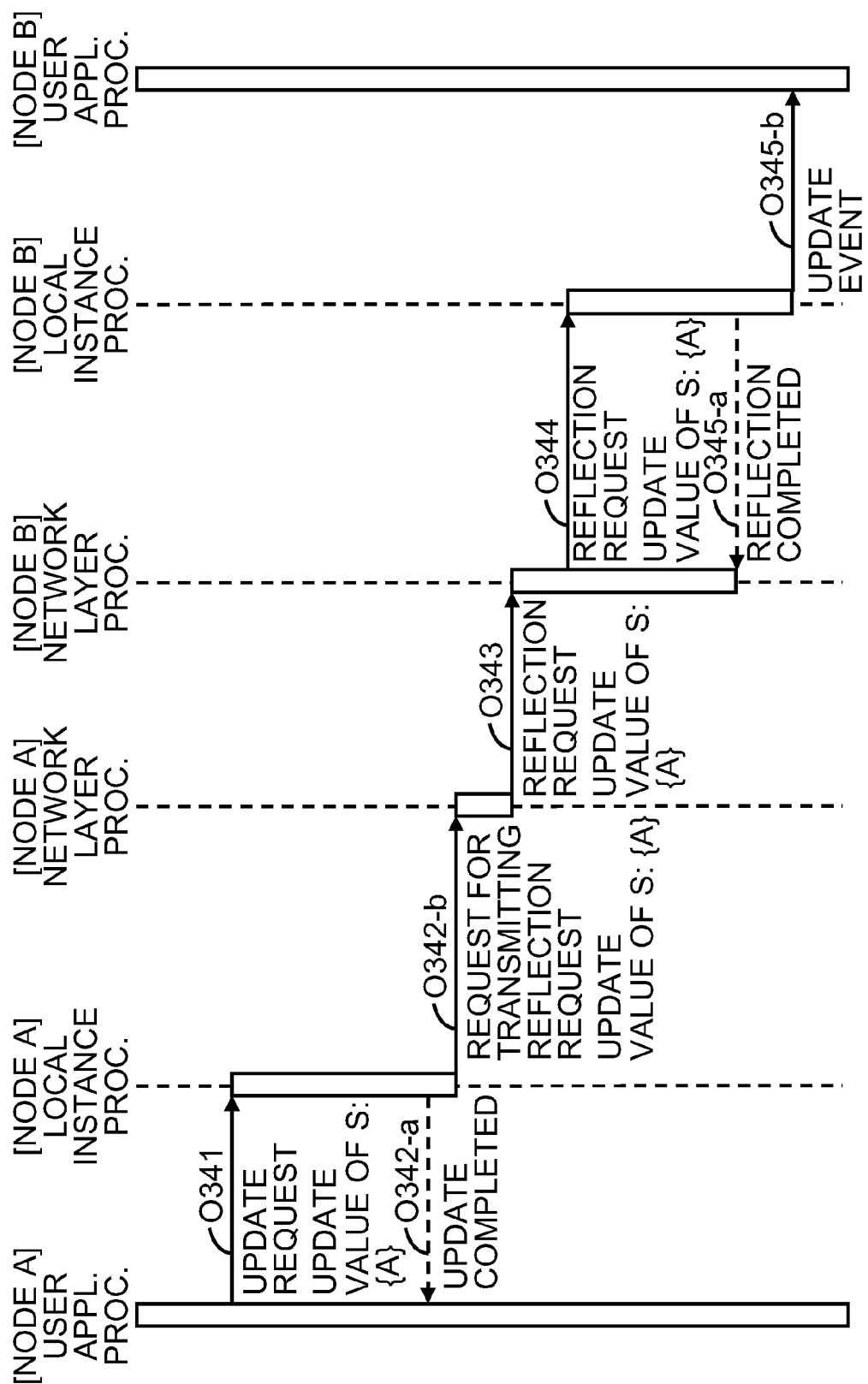
FIG. 34 is a diagram illustrating an example of a process sequence (CE3-B-1) for adding an element "A" to a set as a value of shared data identified by a data key "S" in node A according to an embodiment of the present invention.

FIG. 34 is a diagram illustrating an example of a process sequence (CE3-B-1) for adding an element "A" to a set as a value of shared data identified by a data key "S" in node A according to an embodiment of the present invention.

In operation O341, the user application processor 10 of node A sends the local instance processor 20 of node A an update request for updating the value of the shared data identified by the data key "S" to be augmented by "A".

In operation O342-a, the local instance processor 20 of node A updates the set as the value of the shared data identified by the data key "S" stored in the local instance map 20A of node A to be augmented by an element "A". As a result, the value of the shared data identified by the data key "S" stored in the local instance map 20A of node A becomes "{A}". The local instance processor 20 of node A returns the user application processor 10 of node A a notification conveying that the update has been completed.

In operation O342-b, the local instance processor 20 of node A sends the network layer processor 30 of node A a request for transmitting a reflection request for reflecting the update to the value of the shared data identified by the data key "S" shared with another node.

In operation O343, the network layer processor 30 of node A transmits the reflection request to the network layer processor 30 of node B which is registered in node A, i.e., whose node identifier is stored in the network layer map 30A of node A, as a node sharing the shared data identified by the data key "S".

In operation O344, the network layer processor 30 of node B sends the local instance processor 20 of node B the reflection request for reflecting the update to the value of the shared data identified by the data key "S" stored in the local instance map 20A of node B.

In operation O345-a, the local instance processor 20 of node B updates the set as the value of the shared data identified by the data key "S" stored in the local instance map 20A of node B to be augmented by an element "A" in accordance with the update function "add( )". As a result, the value of the shared data identified by the data key "S" stored in the local instance map 20A of node B becomes "{A}". The local instance processor 20 of node B returns the network layer processor 30 of node B a notification conveying that the reflection has been completed. Since there is no node sharing the shared data identified by the data key "S" except node A that is the source node from which the reflection request is transmitted, the reflection request is not further transmitted to another node from the network layer processor 30 of node B at this time.

In operation O345-b, the local instance processor 20 of node B sends the user application processor 10 of node B an update event for notifying that the value of the shared data identified by the data key "S" stored in the local instance map 20A of node B has been updated.

Figure 35:
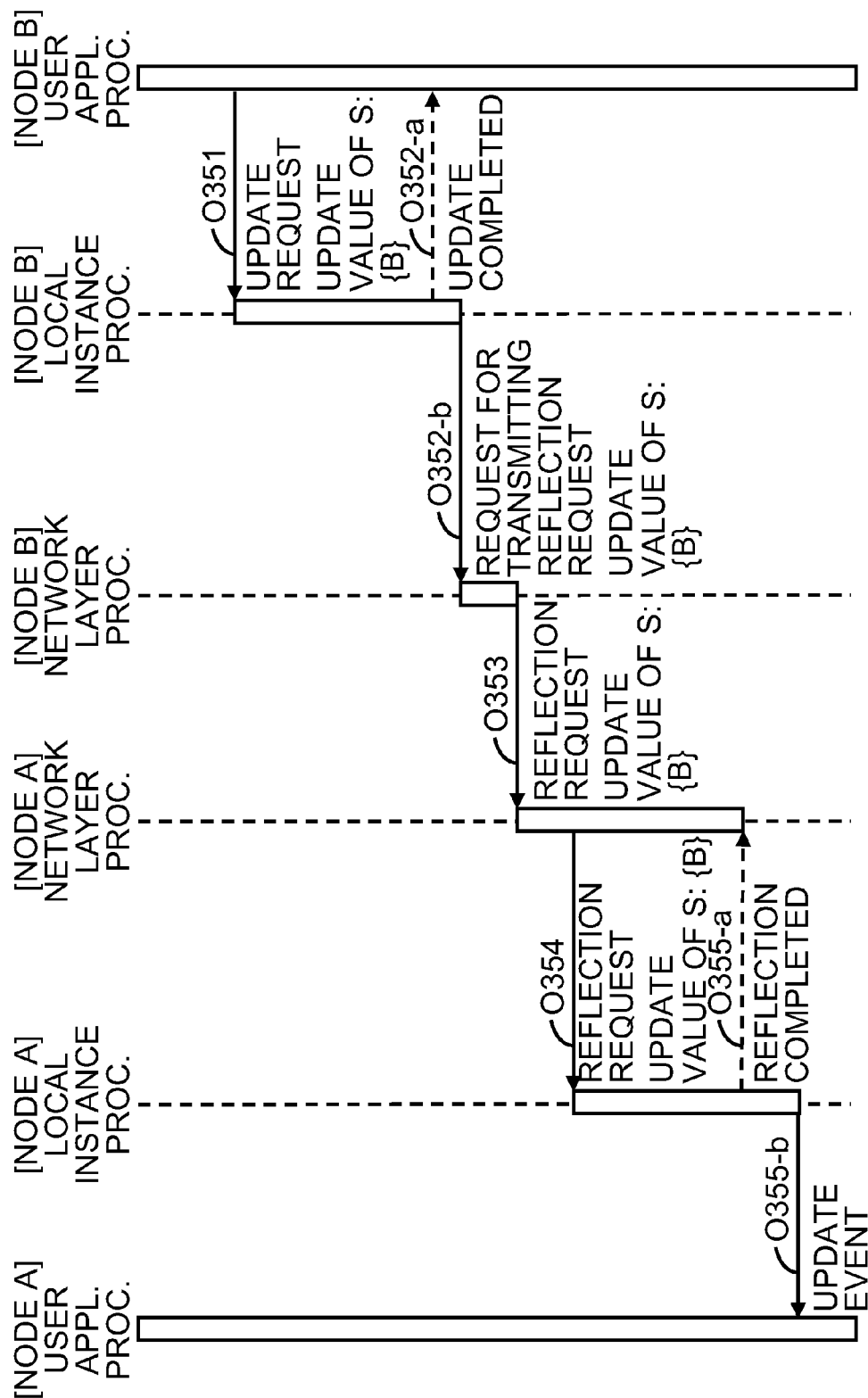
FIG. 35 is a diagram illustrating an example of a process sequence (CE3-B-2) for adding an element "B" to a set as a value of shared data identified by a data key "S" in node B according to an embodiment of the present invention.

FIG. 35 is a diagram illustrating an example of a process sequence (CE3-B-2) for adding an element "B" to a set as a value of shared data identified by a data key "S" in node B according to an embodiment of the present invention.

In operation O351, the user application processor 10 of node B sends the local instance processor 20 of node B an update request for updating the value of the shared data identified by the data key "S" to be augmented by "B".

In operation O352-a, the local instance processor 20 of node B updates the set as the value of the shared data identified by the data key "S" stored in the local instance map 20A of node B to be augmented by an element "B". As a result, the value of the shared data identified by the data key "S" stored in the local instance map 20A of node B becomes "{A, B}". The local instance processor 20 of node B returns the user application processor 10 of node B a notification conveying that the update has been completed.

In operation O352-b, the local instance processor 20 of node B sends the network layer processor 30 of node B a request for transmitting a reflection request for reflecting the update to the value of the shared data identified by the data key "S" shared with another node.

In operation O353, the network layer processor 30 of node B transmits the reflection request to the network layer processor 30 of node A which is registered in node B, i.e., whose node identifier is stored in the network layer map 30A of node B, as a node sharing the shared data identified by the data key "S".

In operation O354, the network layer processor 30 of node A sends the local instance processor 20 of node A the reflection request for reflecting the update to the value of the shared data identified by the data key "S" stored in the local instance map 20A of node A.

In operation O355-a, the local instance processor 20 of node A updates the set as the value of the shared data identified by the data key "S" stored in the local instance map 20A of node A to be augmented by an element "B" in accordance with the update function "add( )". As a result, the value of the shared data identified by the data key "S" stored in the local instance map 20A of node A becomes "{A, B}". The local instance processor 20 of node A returns the network layer processor 30 of node A a notification conveying that the reflection has been completed.

In operation O355-b, the local instance processor 20 of node A sends the user application processor 10 of node A an update event for notifying that the value of the shared data identified by the data key "S" stored in the local instance map 20A of node A has been updated.

Figure 36:
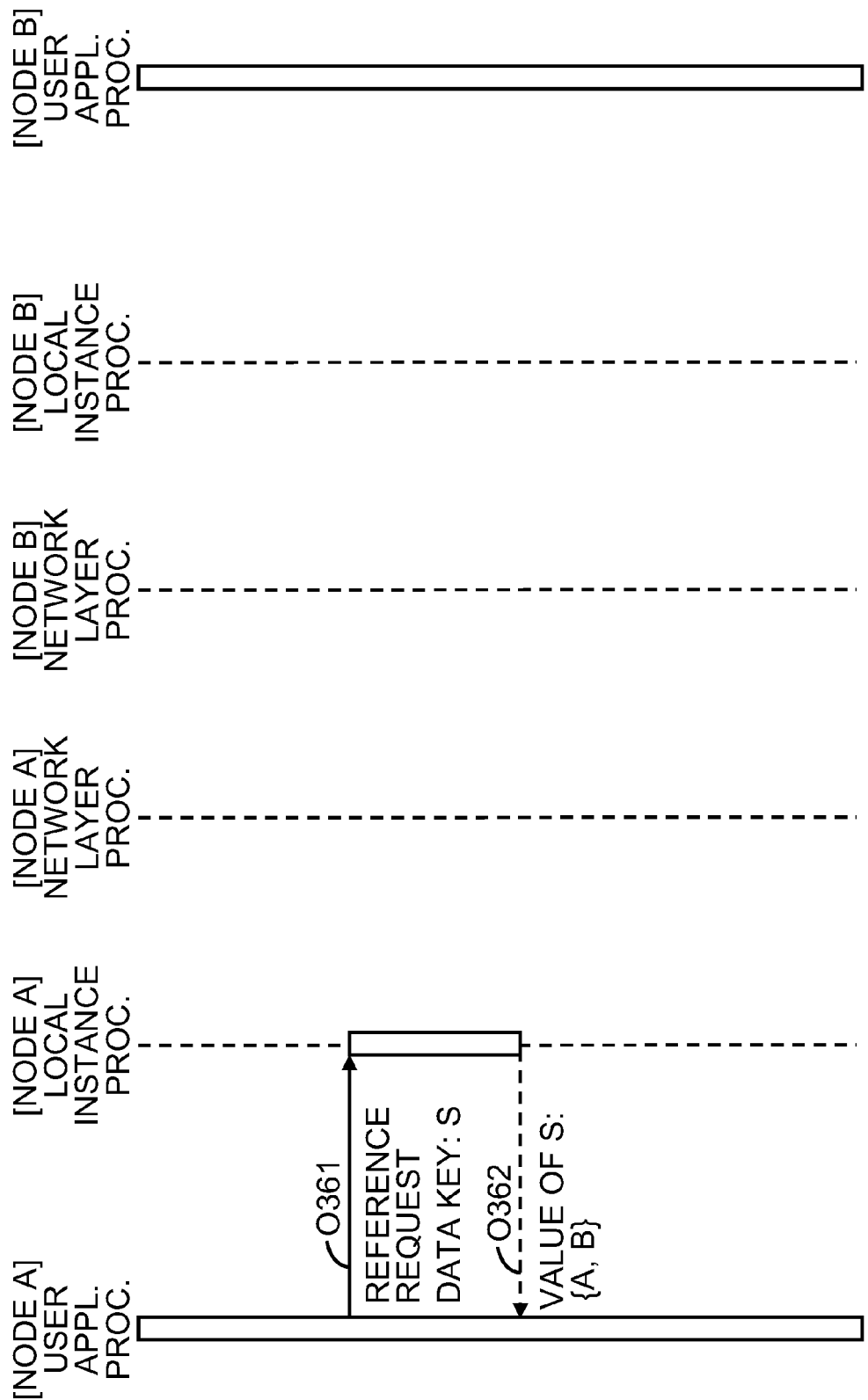
FIG. 36 is a diagram illustrating an example of a process sequence (CE3-B-3) for referring to a value of shared data identified by a data key "S" in node A according to an embodiment of the present invention.

FIG. 36 is a diagram illustrating an example of a process sequence (CE3-B-3) for referring to a value of shared data identified by a data key "S" in node A according to an embodiment of the present invention.

In operation O361, the user application processor 10 of node A sends the local instance processor 20 of node A a reference request for referring to the value of the shared data identified by the data key "S".

In operation O362, the local instance processor 20 of node A returns the user application processor 10 of node A the value "{A, B}" of the shared data identified by the data key "S" stored in the local instance map 20A of node A.

Figure 37:
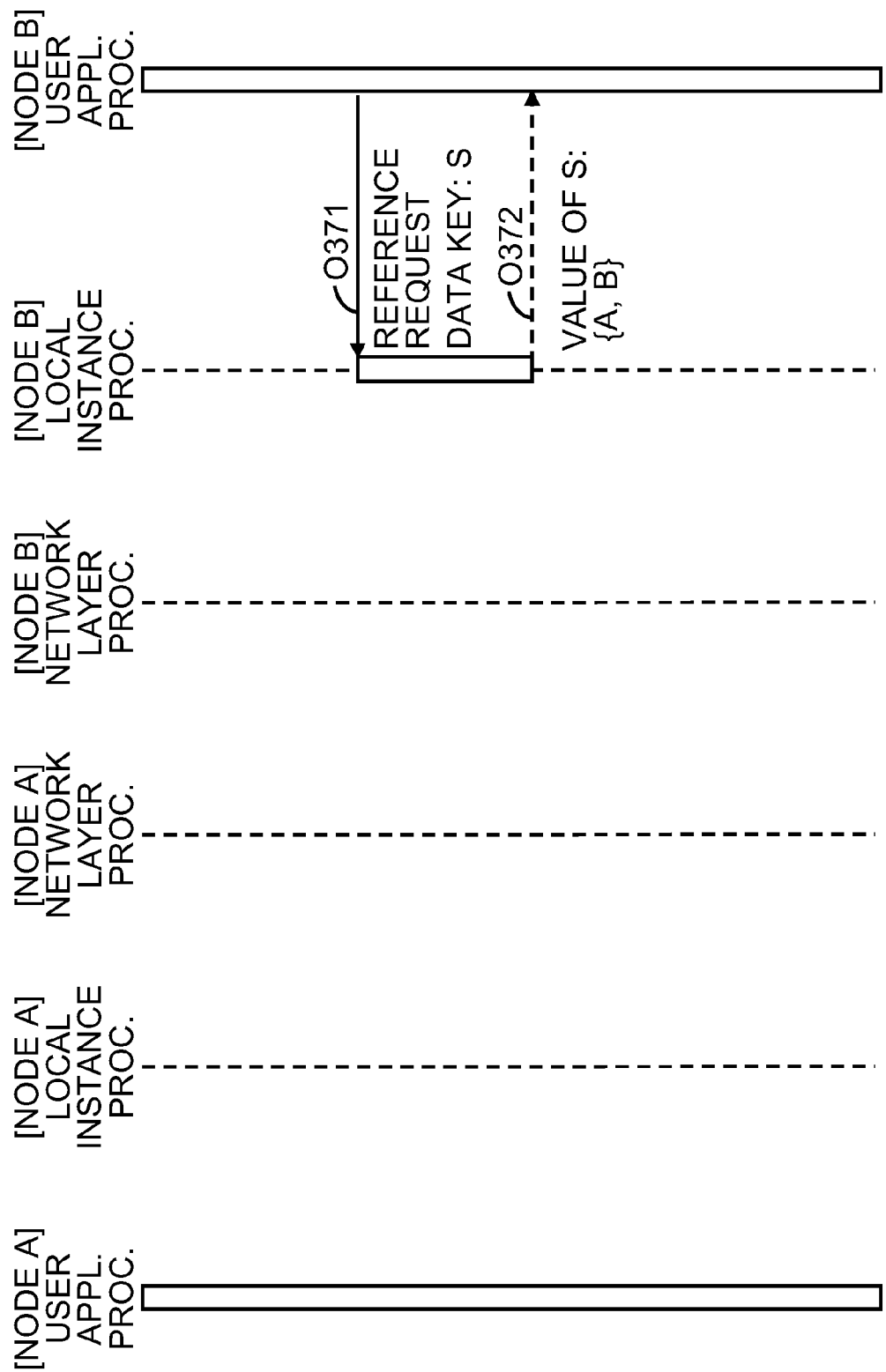
FIG. 37 is a diagram illustrating an example of a process sequence (CE3-B-4) for referring to a value of a shared data identified by a data key "S" in node B according to an embodiment of the present invention.

FIG. 37 is a diagram illustrating an example of a process sequence (CE3-B-4) for referring to a value of a shared data identified by a data key "S" in node B according to an embodiment of the present invention.

In operation O371, the user application processor 10 of node B sends the local instance processor 20 of node B a reference request for referring to the value of the shared data identified by the data key "S".

In operation O372, the local instance processor 20 of node B returns the user application processor 10 of node B the value "{A, B}" of the shared data identified by the data key "S" stored in the local instance map 20A of node B.

Figure 38:
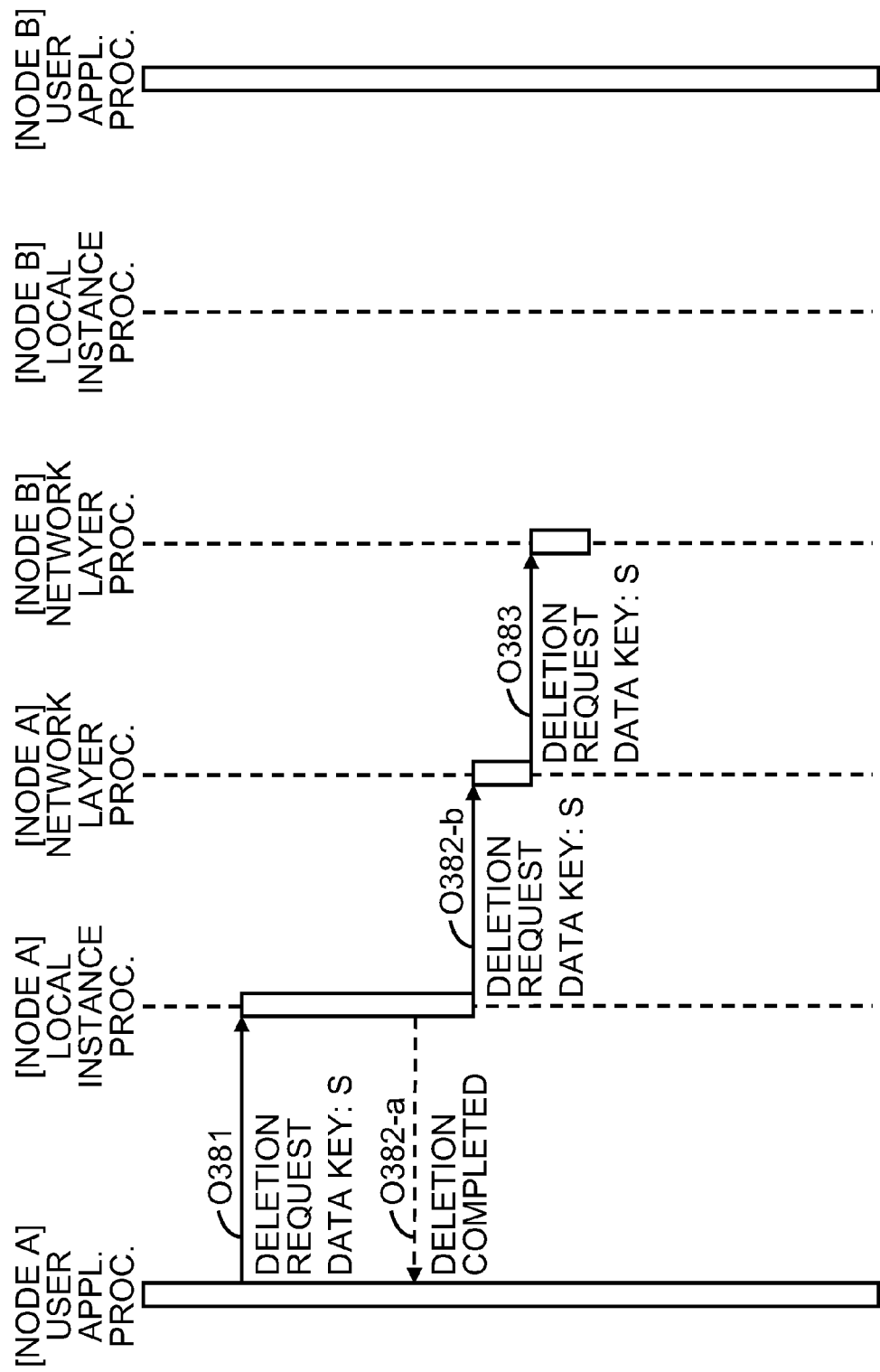
FIG. 38 is a diagram illustrating an example of a process sequence (CE3-C-1) for deleting data regarding shared data identified by a data key "S" in node A according to an embodiment of the present invention.

FIG. 38 is a diagram illustrating an example of a process sequence (CE3-C-1) for deleting data regarding shared data identified by a data key "S" in node A according to an embodiment of the present invention.

In operation O381, the user application processor 10 of node A sends the local instance processor 20 of node A a deletion request for deleting the data regarding the shared data identified by the data key "S" from the local instance map 20A of node A. Operations O382-a to O383 are similar to operations O232-a to O233 of the above-discussed concrete example 1 illustrated in FIG. 23, respectively, so that the discussion thereon is omitted.

Figure 39:
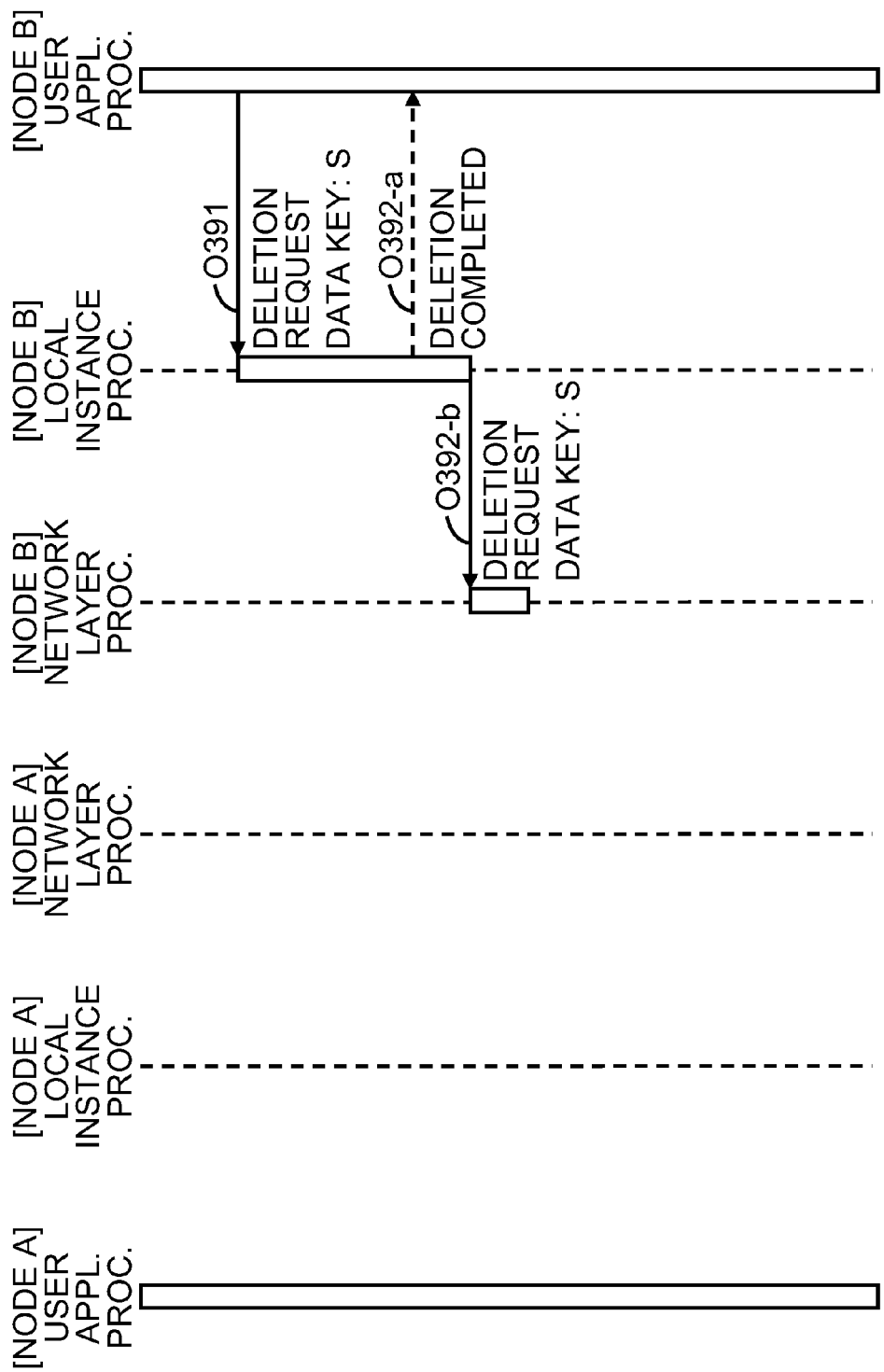
FIG. 39 is a diagram illustrating an example of a process sequence (CE3-C-2) for deleting data regarding shared data identified by a data key "S" in node A according to an embodiment of the present invention.

FIG. 39 is a diagram illustrating an example of a process sequence (CE3-C-2) for deleting data regarding shared data identified by a data key "S" in node B according to an embodiment of the present invention.

In operation O391, the user application processor 10 of node B sends the local instance processor 20 of node B a deletion request for deleting the data regarding the shared data identified by the data key "S" from the local instance map 20A of node B. Operations O392-a and O392-b are similar to operations O242-a and O242-b of the above-discussed concrete example 1 illustrated in FIG. 24, respectively, so that the discussion thereon is omitted.

In the data sharing mechanism according to the embodiments, the local instance map 20A of each node stores a value of the shared data. Even when the user application processor 10 issues a reference request or an update request for the value of the shared data, the access is executed to the local instance map 20A of the self node. Since the value of the shared data is accessed only by the self node, an exclusive access control with another node is not necessary. Upon completion of the access to the value of the shared data stored in the local instance map 20A, the user application processor 10 is notified that the access to the value of the shared data has been completed. On the other hand, the local instance processor 20 and the network layer processor 30 update the value of the shared data registered in another node independently from, i.e., asynchronously with, the process executed by the user application processor 10. Consequently, in the system, the user application processor 10 may access the value of the shared data only by a local access of high speed, without requiring synchronization or an exclusive access control to the value of the shared data registered in another node. Accordingly, a process delay in the user application processor 10 caused by executing remote access to the value of the shared data registered in another node and by executing synchronization or an exclusive access control may be avoided.

In the system, the update function is associated with each shared data whose value is stored in the local instance map 20A. Then, when the update value of the shared data in a node is reflected to another node, the value of the shared data registered in another node is not simply overwritten, and update is executed in accordance with a calculation result by the update function. The update function is commutative and idempotent. Consequently, even when update of the value of the shared data is executed by the user application processor 10 in each of the plurality of nodes, it is not necessary to promptly synchronize with the values of the shared data registered in other nodes in a strict order of updating while executing an exclusive access control. This is because that, even when update order of the values of the shared data is reversed with some nodes to be synchronized, inconsistency does not occur in the value of the shared data between each node.

When data regarding shared data is newly stored in the local instance map 20A, or when a node is activated, the node identifier of each node connected to the network may be stored in the network layer map 30A only when the node identifier has been registered in the node registration file 30B. Reflection of the update to the value of the shared data is also limited to the nodes whose identifiers have been registered in the node registration file 30B. Thus, the nodes to which synchronization of shared data is applied may be changed depending on the content of the node registration file 30B.

Upon receiving a reflection request from another node in which the value of the shared data stored in the local instance map 20A is updated, the local instance processor 20 reflects the update to the value of the shared data stored in the local instance map 20A of the self node, and further execute the followings. That is, the network layer processor 30 transmits a reflection request for reflecting the update to another node, except the source node from which the network layer processor 30 has received the prior reflection request, among other nodes registered in the self node. Thus, the local instance processor 20 may synchronize the value of the shared data with a node registered in the self node as a target for the synchronization, even if the node is not registered as a target for the synchronization in the source node from which the reflection request has been transmitted. Consequently, synchronized nodes increase progressively by repeating the process in each node.

Note that, when the shared data used in the user application processor 10 is only one, it is not necessary to use the data key in the above-discussed process, also in the local instance map 20A and the network layer map 30A.

When the shared data is shared by every node connected to the network and thus the synchronization of the value of the shared data is executed between every node, the node registration file 30B is not necessary. When every shared data is shared by every node connected to the network and thus the synchronization of the value of the every shared data is executed between every node, and when other nodes connected to the network have been identified, the data sharing mechanism may be realized without network layer maps 30A.

The data regarding the shared data shared by each node may be exchanged between nodes at arbitrary timing. This allows surer reflection of the update for synchronization between nodes sharing the shared data.

Besides the above-discussed process executed by the local instance processor 20 and the network layer processor 30, synchronization of the value of the shared data may be made as necessary in every node accessing the value of the shared data. Such synchronization may be made as necessary, for example, when the value of the shared data is required to match in every node sharing the shared data for the user application processor 10 to proceed to the next process, or when the user application processor 10 terminates the process. As a method for confirming that the update in every node is reflected to other nodes, there is the one discussed below. That is, an identifier (ID) for uniquely identifying each update is assigned to every update of the value of the shared data. For every ID, each node transmits to every other node a completion message for confirming whether the update is reflected. Completion of the synchronization of the value of the shared data is confirmed by receiving from every node the response conveying that the update is reflected. As a method for confirming that the value of the shared data of every node matches, checksum and the like may be used.

As a common example of a process executed in distributed computing involving a plurality of nodes, there is a solving of so-called a combinatorial optimization problem such as a delivery problem, an optimal location problem, a traveling salesman problem, or the like. In solving the combinatorial optimization problem, a parallel branch and bound method is employed in order to speed up the process by avoiding redundant searching. When the parallel branch and bound method is executed in distributed computing, the range of the value to be calculated is divided, and a plurality of sub-problems to be solved in each divided range is created and solved in each node through distributed process. As a result of solving the sub-problem, a temporal solution is respectively obtained in each node, and finally, a solution nearest to the targeted solution among the temporal solutions obtained in every node is adopted. By sharing the one, among the temporal solutions obtained in each node, closest to the final solution or an evaluated value thereof, between the nodes solving the sub-problems, pruning may be executed to avoid a needless search in the successive process of solving the sub-problem. For example, the following may be possible in solving a traveling salesman problem in which a route with the minimum travel distance is sought to visit every city before returning to the start point when a plurality of cities and the distance between each city are provided. Suppose that a temporal solution of a route with 100 km of travel distance is obtained as a result of solving a sub-problem in a node. When the travel distance 100 km is the minimum among the travel distances of the temporal solutions obtained in each node for each sub-problem at the moment, the value of 100 km is shared between the nodes as a reference value. In the route search in each node thereafter, when the travel distance of a route exceeds 100 km, calculation for the route may be cut short to omit a needless calculation, since it is apparent that at least the route can not be the final solution.

Prompt synchronization is not necessary for the data shared between nodes for the pruning. Because, delayed synchronization may cause a part of a needless calculation not to be omitted, but may not cause the final result to fall into error. In a parallel processing executed in distributed computing, it is necessary to prioritize avoidance of a process delay due to the synchronization over prompt synchronization of the shared data. In the data sharing mechanism, as discussed above, the synchronization of the shared data is asynchronously executed so as to be independent from the process of the user application processor, so that the process of the user application processor is not delayed. Consequently, the data sharing mechanism is available for sharing the data shared in such a pruning.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium storing a data sharing program that causes a computer to execute a data sharing method, the data sharing method comprising:

storing a value of first shared data in association with a function identifier capable of identifying an update function corresponding to the first shared data upon receiving a registration request from a user application processor included in a first node of a plurality of nodes communicably connected to each other via a network, each of the plurality of nodes including a local instance processor and a user application processor, the registration request storing the value of the first shared data in association with the function identifier, and the update function is executed before updating a stored value of the first shared data, the update function being commutative and idempotent;

applying the update function, identified by the function identifier associated with the first shared data, on the stored value of the first shared data stored in the first node to obtain an execution result upon receiving an update request from the user application processor included in the first node;

updating the stored value of the first shared data stored in the first node to a first update value in accordance with the execution result, an update request updating the stored value of the first shared data stored in the first node to the first update value;

returning a completion message to the user application processor included in the first node upon updating the stored value of the first shared data stored in the first node, the completion message conveying that an update has been completed; and transmitting a first reflection request to a second node upon updating the stored value of the first shared data stored in the first node, the first reflection request updating a stored value of the first shared data stored in the second node to the first update value, wherein the computer acts as a local instance processor included in the first node, and wherein synchronization of a value of the update of shared data between nodes is executed independently from other user application processors.

2. The non-transitory computer-readable medium of claim 1, wherein the transmitting of the first reflection request is executed out of synchronization with the operation of returning a completion message.

3. The non-transitory computer-readable medium of claim 1, the data sharing method comprising:

returning the stored value of the first shared data stored in the first node to the user application processor included in the first node upon receiving a reference request from the user application processor included in the first node, the reference request referring to the stored value of the first shared data stored in the first node.

4. The non-transitory computer-readable medium of claim 1, the data sharing method comprising:

updating the stored value of the first shared data stored in the first node to a second update value in accordance with an execution result the update function identified by the function identifier associated with the first shared data upon receiving a second reflection request from a third node, the second reflection request updating the stored value of the first shared data stored in the first node to the second update value.

5. The non-transitory computer-readable medium of claim 4, the data sharing method comprising:

transmitting a third reflection request to a fourth node other than the third node upon updating the stored value of the first shared data stored in the first node to the second update value in response to the second reflection request, the third reflection request updating a stored value of the first shared data stored in the fourth node to the second update value.

6. The non-transitory computer-readable medium of claim 4, the data sharing method comprising:

sending an update event to the user application processor included in the first node upon updating the stored value of the first shared data stored in the first node in response to the second reflection request, the update event conveying that the stored value of the first shared data stored in the first node has been updated.

7. The non-transitory computer-readable medium of claim 1, wherein the update function is a user defined function which is defined in the user application processor included in the first node.

8. The non-transitory computer-readable medium of claim 1, the data sharing method comprising:

storing node identifiers of the second nodes out of the plurality of nodes, each of the second nodes storing a value of the first shared data which is to be synchronized with the stored value of the first shared data stored in the first node, the node identifier being capable of identifying a node, and wherein in the transmitting of the first reflection request, the first reflection request is transmitted to the second nodes in accordance with stored node identifiers of the second nodes.

9. The non-transitory computer-readable medium of claim 1, the data sharing method comprising:

synchronizing the stored value of the first shared data stored in the first node with a stored value of the first shared data stored in another node when the first node has been activated.

10. The non-transitory computer-readable medium of claim 1, the data sharing method comprising:

deleting data regarding the first shared data stored in the first node, including the function identifier associated with the first shared data, upon receiving a deletion request from the user application processor included in the first node, the deletion request deleting the data regarding the first shared data stored in the first node.

11. The non-transitory computer-readable medium of claim 1, wherein instructions for the storing a value of first shared data, the updating the stored value of the first shared data stored in the first node, and the transmitting of the first reflection request, are provided in the form of middleware executed on an operating system or in the form of libraries linked to a user application program executed by the user application processor.

12. A data sharing method comprising:
storing a value of first shared data in association with a function identifier capable of identifying an update function corresponding to the first shared data upon receiving a registration request from a user application processor included in a first node of a first device included in a plurality of devices communicably connected to each other via a network, each of the plurality of devices including a local instance processor and a user application processor, the registration request storing the value of the first shared data in association with the function identifier, and the update function is executed before updating a stored value of the first shared data, the update function being commutative and idempotent;
applying the update function, identified by the function identifier associated with the first shared data, on the stored value of the first shared data stored in the first node to obtain an execution result upon receiving an update request from the user application processor included in the first node;
updating the stored value of the first shared data stored in the first node to a first update value in accordance with the execution result, an update request updating the stored value of the first shared data stored in the first node to the first update value;
returning a completion message to the user application processor included in the first node upon updating the stored value of the first shared data stored in the first node, the completion message conveying that an update has been completed; and
transmitting a first reflection request to a second node upon updating the stored value of the first shared data stored in the first node, the first reflection request updating a stored value of the first shared data stored in the second node to the first update value, and
wherein synchronization of a value of the update of shared data between nodes is executed independently from other user application processors.

13. A data sharing processor comprising:
a data register to store a value of first shared data in association with a function identifier capable of identifying an update function corresponding to the first shared data upon receiving a registration request from a user application processor included in a first node of a plurality of nodes communicably connected to each other via a network, each of the plurality of nodes including a local instance processor and a user application processor, the registration request storing the value of the first shared data in association with the function identifier, and the update function is executed before updating a stored value of the first shared data, the update function being commutative and idempotent;
a data updater for
applying the update function, identified by the function identifier associated with the first shared data, on the stored value of the first shared data stored in the first node to obtain an execution result upon receiving an update request from the user application processor included in the first node,
updating the stored value of the first shared data stored in the first node to a first update value in accordance with the execution result, an update request updating the stored value of the first shared data stored in the first node to the first update value, and
returning a completion message conveying that an update has been completed to the user application processor included in the first node upon updating the stored value of the first shared data stored in the first node; and
a reflection requester to transmit a first reflection request to a second node upon updating the stored value of the first shared data stored in the first node, the first reflection request updating a stored value of the first shared data stored in the second node to the first update value, and
wherein synchronization of a value of the update of shared data between nodes is executed independently from other user application processors.

* * * * *